(12) United States Patent
Kim

(10) Patent No.: US 9,152,889 B2
(45) Date of Patent: Oct. 6, 2015

(54) POWER SUPPLIER AND IMAGE FORMING APPARATUS INCLUDING THE POWER SUPPLIER

(71) Applicant: Samsung Electronics Co., Ltd., Suwon-si, Gyeonggi-do (KR)

(72) Inventor: Jin-ha Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 405 days.

(21) Appl. No.: 13/655,615

(22) Filed: Oct. 19, 2012

(65) Prior Publication Data

US 2013/0100496 A1 Apr. 25, 2013

(30) Foreign Application Priority Data

Oct. 21, 2011 (KR) .......................... 10-2011-0108115

(51) Int. Cl.
| | | |
|---|---|---|
| H02M 3/335 | (2006.01) | |
| G06K 15/00 | (2006.01) | |
| H02M 7/02 | (2006.01) | |
| H02M 3/156 | (2006.01) | |
| H02M 1/32 | (2007.01) | |

(52) U.S. Cl.
CPC ............... *G06K 15/00* (2013.01); *H02M 3/156* (2013.01); *H02M 7/02* (2013.01); *H02M 2001/322* (2013.01)

(58) Field of Classification Search
CPC .................................. H02M 3/156; H02M 7/02
USPC ............ 363/16, 20, 21.01; 323/268, 271, 272
See application file for complete search history.

(56) References Cited

U.S. PATENT DOCUMENTS

| | | | | |
|---|---|---|---|---|
| 6,166,924 A | * | 12/2000 | Assow | 363/20 |
| 7,505,291 B2 | * | 3/2009 | Wang et al. | 363/89 |
| 2012/0025802 A1 | * | 2/2012 | Carmen | 323/320 |

FOREIGN PATENT DOCUMENTS

| | | |
|---|---|---|
| JP | 08-033338 | 2/1996 |
| KR | 10-2000-0050365 | 8/2000 |
| KR | 10-2009-0094724 | 8/2009 |

OTHER PUBLICATIONS

Office Action issued in Korean Application No. 10-2011-0108115 on Jun. 28, 2013.
Notice of Allowance issued in Korean Application No. 10-2011-0108115 on Nov. 19, 2013.

* cited by examiner

*Primary Examiner* — Matthew Nguyen
(74) *Attorney, Agent, or Firm* — Staas & Halsey LLP

(57) ABSTRACT

A power supplier includes a power supply to provide a supplied power to the power supplier, a first capacitor charged by a predetermined voltage corresponding to supplied power supply, a power state detector to detect an on-state or an off-state of the power supply, a first controller to generate a first discharge control signal that has a signal level varying according to the state of the power supply and controls discharging of the predetermined voltage charged in the first capacitor, and a discharger connected to the first capacitor in parallel and to discharge the predetermined voltage charged in the first capacitor in response to the first discharge control signal, thereby reducing discharge risks to a user.

31 Claims, 14 Drawing Sheets

(a)

(b)

POWER SUPPLIER AND IMAGE FORMING APPARATUS INCLUDING THE POWER SUPPLIER

CROSS-REFERENCE TO RELATED APPLICATIONS

This application claims the benefit of Korean Patent Application No. 10-2011-0108115, filed on Oct. 21, 2011, in the Korean Intellectual Property Office, the disclosure of which is incorporated herein in its entirety by reference.

BACKGROUND

1. Field

The present general inventive concept relates to a power supplier to supply power through a switching mode operation, and an image forming apparatus including the power supplier, and more particularly, to a power supplier capable of increasing in-use safety and product reliability, and an image forming apparatus including the power supplier.

2. Description of the Related Art

Generally, a power supplier to supply power is required to operate an electronic device. Recently, a switch mode power supply (SMPS) that provides a stable direct current (DC) output voltage by controlling a current flowing through an inductor by using a pulse-width modulated signal has been used in electronic products.

The SMPS uses a semiconductor device, such as a metal oxide semiconductor filed effect transistor (MOSFET) for power, as a switch, and controls the current flowing through the inductor by using the switch so as to output a DC output voltage having any one of various values. The SMPS is widely used since the SMPS has high power converting efficiency compared to a conventional linear power supplier and has a small volume, by controlling switching of the semiconductor device.

FIG. 1 is a diagram of a general power supplier 100.

Referring to the power supplier 100 of FIG. 1, a capacitor 125 is charged by using a predetermined voltage supplied through a power supply (V1) 110.

As a predetermined voltage of a DC component is charged in the capacitor 125, a predetermined voltage is trapped between a first node N1 and a second node N2. Hereinafter, a voltage trapped at both terminals of the capacitor 125 is denoted by Vc. Also, a Voltage Vc is trapped at both terminals of a first inductor 131.

When a switching device 132 is turned on, a transformer including the first inductor 131 and a second inductor 133 transforms a voltage at both terminals of the first inductor 131 and transmits the transformed voltage to the second inductor 133. A transformation ratio varies according to turn ratios of the first and second inductors 131 and 133.

A first controller 140 outputs a switching control signal to control an on or off position of the switching device 132. In FIG. 1, a MOS transistor is used as the switching device 132, and the switching control signal is applied to a third node N3 constituting a gate terminal of the switching device 132.

When the switching control signal turns on the switching device 132, a current flows through the first inductor 131, thereby generating an induced current in the second inductor 133, and thus a predetermined voltage is trapped at both terminals of the second inductor 133. Also, a current flowing through the second inductor 133 is rectified through a diode 151 and is supplied to a fourth node N4 constituting an output terminal. Also, a load 160 having a predetermined value may be connected to the fourth node N4.

According to the energy related international standard, standby power of an electronic product including a power supplier is limited to 0.5 W or below. Thus, manufacturers of an SMPS reduce power consumption of devices consuming power, such as a discharge resistor and a dummy load, in the SMPS.

However, when loads of the discharge resistor, the dummy load, etc. in the SMPS are reduced, a discharge time of the capacitor 125 is increased, and thus an error may be generated during rebooting. Further, even if the SMPS is turned off, a user may get an electric shock due to a voltage left in the capacitor 125.

Here, the discharge time denotes time taken from a point of time when supply of power applied to the capacitor 125 is blocked to a point of time when a voltage trapped at both terminals of the capacitor 125 is decreased to a predetermined voltage or lower.

For example, even if the power supply 110 is blocked to repair the SMPS or the like, a voltage remains in the capacitor 125. Thus, when the user contacts the capacitor 125, the user may get an electric shock or be burned due to the electric shock.

SUMMARY

Accordingly, there is a need for an SMPS to have reduced power consumption without a danger of harming a user by an electric discharge of the SMPS. The present general inventive concept provides a power supplier capable of reducing a possibility of discharge to a user, and an image forming apparatus including the power supplier.

In detail, the present general inventive concept provides a power supplier capable of reducing a possibility of a discharge to a user, which may occur when the power supplier is turned off, and an image forming apparatus that includes the power supplier.

Additional features and utilities of the present general inventive concept will be set forth in the description which follows and, in part, will be obvious from the description, or may be learned by practice of the present general inventive concept.

Exemplary embodiments of the present general inventive concept, can provide a power supplier including a power supply to provide a supplied power to the power supplier, a first capacitor charged by a predetermined voltage corresponding to a supplied power, a power state detector to detect an on or off state of the power supply, a first controller to generate a first discharge control signal that has a signal level varying according to the state of the supplied power and to control discharging of the predetermined voltage charged in the first capacitor, and a discharger connected to the first capacitor in parallel to discharge the predetermined voltage charged in the first capacitor in response to the first discharge control signal.

The discharger may include a first switching device connected to the first capacitor in parallel that is turned on or off in response to the first discharge control signal.

The first controller may transmit the first discharge control signal to the discharger to turn on the first switching device, if the state of the power supply is in the off-state.

The discharger may include a discharge resistor having one terminal connected to one terminal of the first capacitor, and the first switching device having one terminal and an other terminal connected to an other terminal of the discharge resistor and the an terminal of the first capacitor, respectively, and that is turned on or off in response to the first discharge control signal.

The power state detector may determine at least one of an on-state and an off-state of the power supply by using a resistance-capacitance time-constant value.

The power supplier may further include a power supply unit for supplying the power.

The power supply unit may include the power supply to supply an alternating current (AC) voltage, an electromagnetic interference (EMI) filter connected to the power supply in parallel to filter an EMI component generated in the AC voltage, and a first rectifier to convert the AC voltage filtered through the EMI filter to a direct current (DC) voltage.

The EMI filter may include an EMI capacitor connected to the power supply in parallel, and an EMI resistor connected to the EMI capacitor in parallel.

The EMI filter may include an EMI capacitor connected to the power supply in parallel, an EMI resistor having one terminal connected to one terminal of the EMI capacitor, and an EMI switching device having one terminal and an other terminal connected to an other terminal of the EMI resistor and an other terminal of the EMI capacitor, respectively, and that is turned on or off by the first controller.

The first controller may output a second discharge control signal to the EMI filter to turn on the EMI switching device, if the power supply is in the off-state.

The first controller may generate at least one switching driving signal, and the power supplier may further include a switching transformer connected to the first capacitor in parallel to transform the predetermined voltage charged in the first capacitor according to a switching transformation operation performed in response to the switching driving signal, and an output terminal to output an output voltage corresponding to the transformed predetermined voltage by the switching transformer.

The power supplier may include a feedback loop connected to the output terminal to compare the output voltage actually output from the output terminal and a target voltage to be output from the output terminal, and to adjust the switching driving signal according to the comparison result.

The feedback loop may include a voltage comparator connected to the output terminal to compare the output voltage and the target voltage, a photo coupler to generate a feedback signal corresponding to a difference value between the output voltage and the target voltage, and a feedback controller to adjust the switching driving signal such that the output voltage is converged to the target voltage in response to the feedback signal.

The power supplier may further include a first output load having one terminal connected to the output terminal, a third switching device having one terminal and the other terminal connected to the other terminal of the first output load and ground, respectively, and a second controller to receive state information of the power supply through the first controller, and if the power supply is in the off-state, to control the third switching device such that the first output load is connected to the ground, or to control the power consumption of the first output load to increase.

The second controller may receive the state information of the power supply through the first controller, and if the power supply is in the off-state, the second controller may back up a secondary side system receiving the output voltage.

The switching transformer may include a primary coil unit including a first inductor having one terminal connected to one terminal of the first capacitor, and a second switching device having one terminal and an other terminal connected to to connected to an other terminal of the first inductor and an other terminal of the first capacitor, respectively, and wherein the secondary coil unit may include a second inductor receiving predetermined power from the primary coil unit.

The first controller may generate at least two switching driving signals to control the switching transformation operation, and the switching transformer may perform the switching transformation operation in response to the at least two switching driving signals, and may include at least two switching transformers connected to the first capacitor in parallel.

The switching transformer may include a primary coil unit including a first inductor having one terminal connected to one terminal of the first capacitor, a second switching device connected to an other terminal of the first inductor, and that is turned on or off in response to the switching driving signal, and a secondary coil unit including a plurality of second inductors receiving predetermined power from the primary coil unit and connected in series, wherein each of the plurality of second inductors output the output voltage from one terminal.

The switching transformer may include a primary coil unit including a first inductor having a terminal connected to a terminal of the first capacitor, a second switching device connected to an other terminal of the first inductor, and is turned on or off in response to the switching driving signal, and a secondary coil unit including a plurality of second inductors receiving predetermined power from the primary coil unit and connected in parallel, wherein each of the plurality of second inductors output the output voltage from one terminal.

Exemplary embodiments of the present general inventive concept, may also provide an image forming apparatus including a processor to control image data to be printed, a printing unit to print the image data according to control of the processor, and a power supplier to supply predetermined power supply to each element including the processor and the printing unit, wherein the power supplier may include a power supply to provide a supplied power to the power supplier, a first capacitor charged by a predetermined voltage corresponding to supplied power supply; a power state detector to detect an on-state or an off-state of the power supply, a first controller to generate a first discharge control signal that has a signal level varying according to the state of the power supply and to control discharging of the predetermined voltage charged in the first capacitor, and a discharger connected to the first capacitor in parallel to discharge the predetermined voltage charged in the first capacitor in response to the first discharge control signal.

The image forming apparatus may further include, an interface unit to receive the image data, predetermined data, or a command from a user, and a storage unit to store the image data received from the interface unit.

Exemplary embodiments of the present general inventive concept may also provide an electronic device that may include a power supply to provide a supplied power to the power supplier, a first capacitor charged by a predetermined voltage corresponding to the supplied power, a power state detector to detect an on-state or an off-state of the power supply, a first controller to generate a first discharge control signal that has a signal level varying according to the state of the power supply and to control discharge of the predetermined voltage charged in the first capacitor, and a discharger connected to the first capacitor in parallel to discharge the predetermined voltage charged in the first capacitor in response to the first discharge control signal.

The discharger may turn on a first switching device to discharge the predetermined voltage of the first capacitor when the power supply is in the off-state.

Exemplary embodiments of the present general inventive concept may also provide a power supplier including a power supply to provide a supplied power to a first capacitor, a power state detector to detect a state information of the power supply, a first controller to receive the state information and generate a first discharge control signal according to the detection information, and a discharger to receive the first discharge control signal from the first controller and turn on a first switching device to discharge the supplied power to the first capacitor.

The discharger may turn on the first switching device when the state information of the power supply indicates that the power supply is in the off-state.

The first controller may generate a switching driving signal to control a switching transformation operation of a switching transformer so that the switching transformer can turn on a second switching device when the power supply is in the off-state to discharge the supplied power to the first capacitor.

The power supplier may further include an electromagnetic interference (EMI) filter to filter an EMI component generated in the power supply, and an EMI capacitor to receive the supplied power from the power supply.

The EMI filer may include an EMI switching device to receive a second discharge control signal from the first controller when the power state detector detects that the power supply is in the off-state to discharge the supplied power of the EMI capacitor.

The power supplier may also include a second controller to receive the state information of the power supply from the first controller and to generate a third discharge control signal to turn on a third switching device to discharge the supplied power to the first capacitor.

The power supplier may include an information transmitter to transmit the state information of the power supply received from the first controller to the second controller.

The power supplier may enter a standby mode to reduce a power consumption of the power supplier when the power supply is in the off-state.

The power state detector may include an internal capacitor that forms a resistance-capacitance (RC) circuit with a resistor so that the power state detector can detect when the power supply in in the off-state by determining if a time taken for a power charged in the internal capacitor to drop a certain level is less than or equal to a predetermined time.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
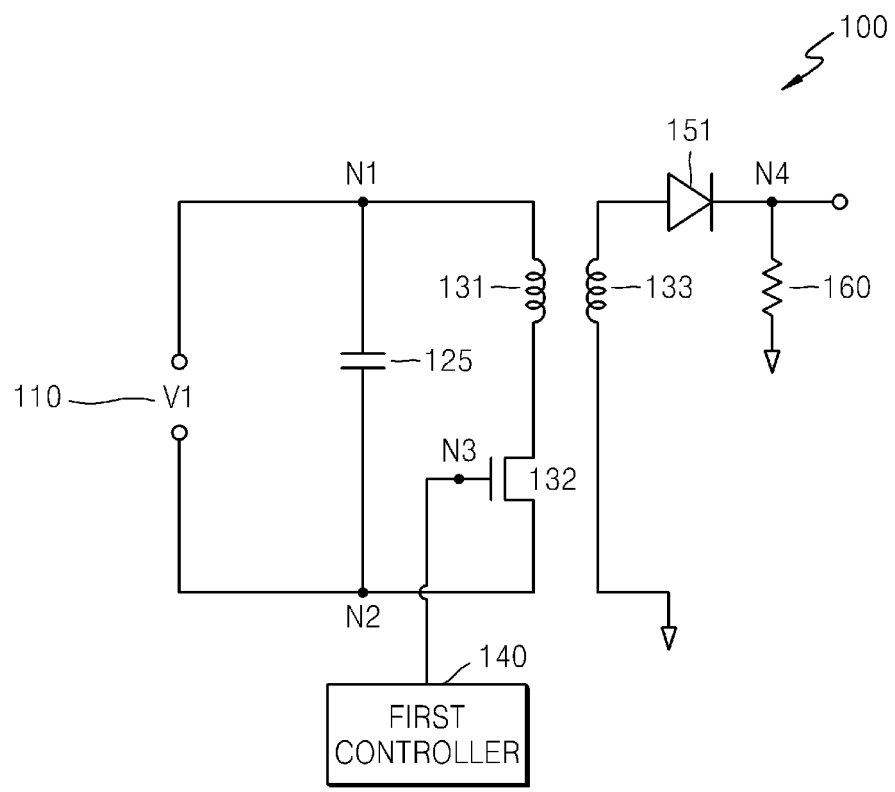
FIG. 1 is a diagram illustrating a general power supplier.

Hereinafter, a power supplier and an image forming apparatus including the power supplier according to embodiments of the present general inventive concept are described with reference to accompanying drawings. Expressions such as "at least one of," when preceding a list of elements, modify the entire list of elements and do not modify the individual elements of the list.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
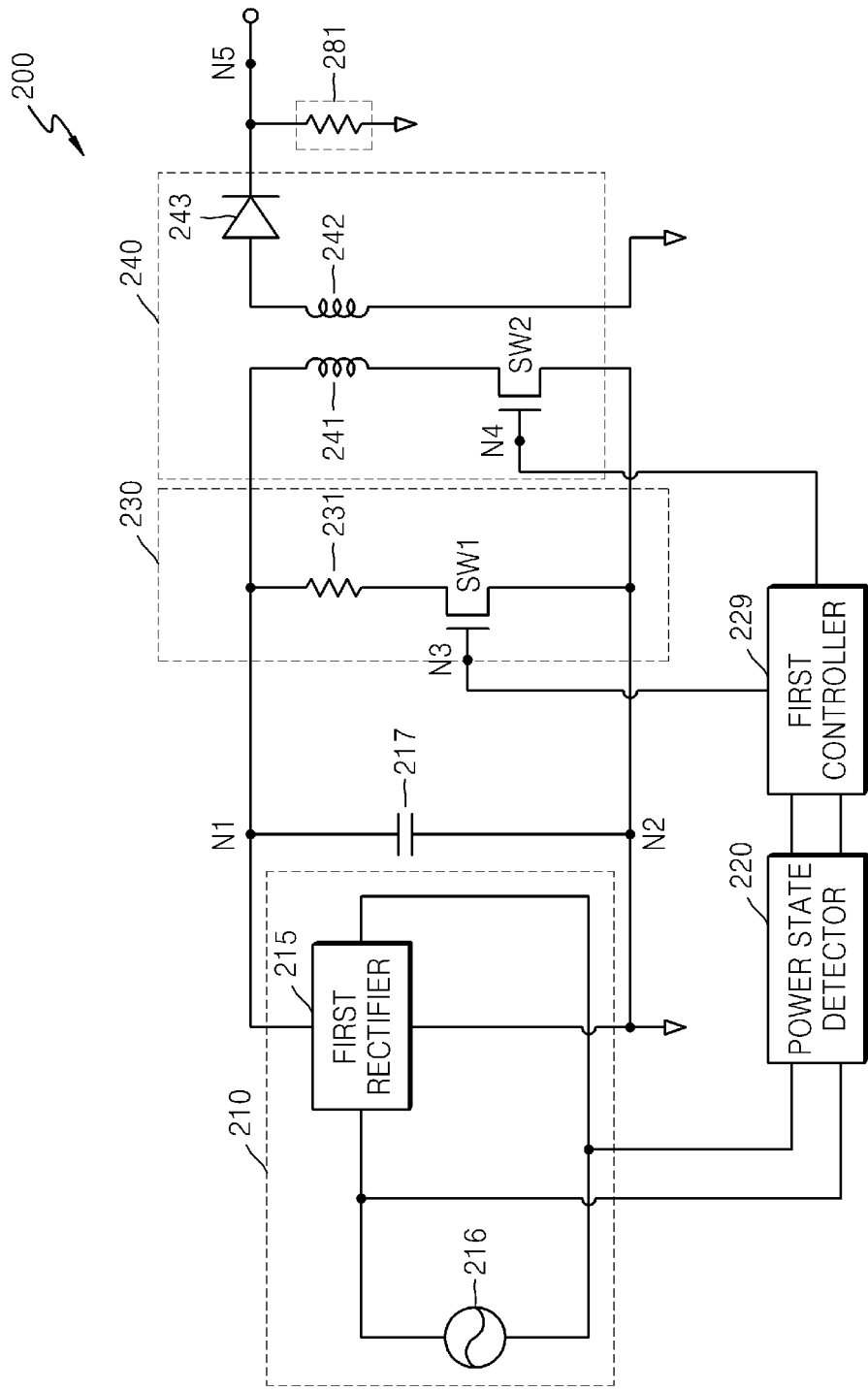
FIG. 2 is a diagram illustrating a power supplier according to an embodiment of the present general inventive concept.

FIG. 2 is a diagram illustrating a power supplier 200 according to an embodiment of the present general inventive concept.

Referring to FIG. 2, the power supplier 200 according to the current embodiment is a switching mode power supplier, which includes a first capacitor 217, a power state detector 220, a first controller 229, and a discharger 230. The power supplier 200 according to the current embodiment may include a switching transformer 240 and an output terminal N5. The power supplier 200 may further include at least one of a power supply unit 210 and an output load unit 281. The first capacitor 217 supplies a predetermined voltage to the switching transformer 240 by being charged with a predetermined voltage.

The power supply unit 210 supplies a power to the power supplier 200. In detail, the power supply unit 210 may include a power supply 216 and a first rectifier 215. For example, the power supply 216 may be physically spaced apart from the power supplier 200, and in this case, the power supply unit 210 may only include the first rectifier 215. In FIG. 2, the power supply unit 210 includes both the power supply 216 and the first rectifier 215.

When the power supply 216 is physically spaced apart from the power supply unit 210 of the power supplier 200, the power supply 216 and the power supply unit 210 may be connected via a connection device, such as a consent plug.

The power supply 216 supplies an alternating current (AC) voltage. In detail, a power voltage of 100 Vac to 240 Vac supplied through a power consent plug may be supplied to the power supplier 200. The power supply 216 may operate as a zero power source by connecting or disconnecting a power cord or turning a power switch on or off. Hereinafter, it is considered that the power is turned off if the power supply 216 supplies zero power and the power is turned on if the power supply 216 supplies power having a predetermined voltage.

The first rectifier 215 rectifies and converts the AC voltage supplied from the power supply 216 to a direct current (DC) voltage. In detail, a negative voltage is removed or converted from the AC voltage supplied from the power supply 216 to obtain the DC voltage. Accordingly, the DC voltage output from the first rectifier 215 may be a positive DC component voltage.

The first capacitor 217 is charged with a predetermined voltage corresponding to power supplied from the power supply unit 210. In detail, the first capacitor 217 is connected between a first node N1 constituting one output terminal of the first rectifier 215 and a second node N2 constituting the other output terminal of the first rectifier 215.

The power state detector 220 detects an on-state or an off-state of the power supply 216. Also, the power state detector 220 transmits detection information to the first controller 229.

The first controller 229 generates a first discharge control signal that varies according to the on or off-state of the power supply 216 detected by the power state detector 220, and transmits the first discharge control signal to the discharger 230. The first controller 229 generates at least one switching driving signal. In detail, the first controller 229 generates the switching driving signal to control a switching transformation operation performed in the switching transformer 240, and transmits the switching driving signal to the switching transformer 240.

The switching transformer 240 is connected to the first capacitor 217 in parallel. In detail, the switching transformer 240 performs the switching transformation operation in response to the switching driving signal received from the first controller 229. The switching transformer 240 transforms and transmits the voltage charged in the first capacitor 217 to the output terminal N5 according to the switching transformation operation.

In detail, the switching transformer 240 includes a primary coil unit and a secondary coil unit, which perform a switching transformation operation.

The primary coil unit may include a first inductor 241 and a second switching device SW2 for determining whether to perform the switching transformation operation.

The secondary coil unit includes a second inductor 242 that transforms a voltage received from the first inductor 241 according to a predetermined turn ratio. The secondary coil unit may include a diode 243 to rectify a current output from the second inductor 242.

When a coil number of the first inductor 241 is N1 and a coil number of the second inductor 242 is N2, a turn ratio is N1/N2. When a voltage at two terminals of the first inductor 241 is V1, a voltage V2 at two terminals of the second inductor 242 is (N2/N2)×V1. Thus, a voltage of the output terminal N5 may be adjusted by adjusting the turn ratio.

In detail, one terminal of the first inductor 241 is connected to the first node N1 of the first capacitor 217.

One terminal and an other terminal of the second switching device SW2 are connected to an other terminal of the first inductor 241 and the second node N2 of the first capacitor 217, respectively, and the second switching device SW2 is turned on or off in response to the switching driving signal.

Switching devices described herein, such as a first switching device SW1 and the second switching device SW2 may be a semiconductor switching device, such as a field effect transistor (FET), a metal oxide semiconductor (MOS) transistor, an insulated gate bipolar transistor (IGBT), or the like. In FIG. 2, a MOS transistor is used as a switching device.

Hereinafter, the second switching device SW2 is an N-type MOS transistor, as shown in FIG. 2. The first controller 229 outputs a switching control signal in a logic high level, when the first controller 229 controls the switching transformer 240 to perform the switching transformation operation. Alternatively, the first controller 229 outputs a switching control signal in a logic low level, when the first controller 229 controls the switching transformer 240 so as not to perform the switching transformation operation.

When the switching signal in a logic high level is input to a fourth node N4 that can include a gate terminal of the second switching device SW2, a current generated due to a voltage difference at two terminals of the first capacitor 217 flows through the first inductor 241. Accordingly, an induced current flows through the second inductor 242, and a predetermined voltage is trapped at two terminals of the second inductor 242.

When the switching control signal in a logic low level is input to the fourth node N4, a current does not flow through the first inductor 241, and the switching transformer 240 does not perform the switching transformation operation.

The discharger 230 is connected to the first capacitor 217 in parallel. In detail, the discharger 230 may be disposed between the first node N1 and the second node N2, which are two terminals of the first capacitor 217, as illustrated in FIG. 2. Also, the discharger 230 discharges the voltage charged in the first capacitor 217 in response to a first discharge control signal to control the voltage charged in the first capacitor 217 to be discharged.

In detail, the discharger 230 is connected to the first capacitor 217 in parallel, and may include the first switching device SW1 that is turned on or off in response to the first discharge control signal received from the first controller 229. The discharger 230 may further include a discharge resistor 231 that is connected to the first switching device SW1 in series.

In FIG. 2, one terminal of the discharge resistor 231 is connected to the first node N1 of the first capacitor 217, an other terminal of the discharge resistor 241 is connected to one terminal of the first switching device SW1, and an other terminal of the first switching device SW1 is connected to the second node N2 of the first capacitor 217. Also, in FIG. 2, the first switching device SW1 includes an N-type MOS transistor, and a first discharge control signal is input to a third node N3 constituting a gate terminal of the first switching device SW1.

In detail, when the power supply 216 is in an off-state, the first controller 229 transmits the first discharge control signal to the discharger 230 to turn on the first switching device SW1. Also, when the power supply 216 is in an on-state, the first controller 229 transmits the first discharge control signal to the discharger 230 to turn off the first switching device SW1.

Figure 3:
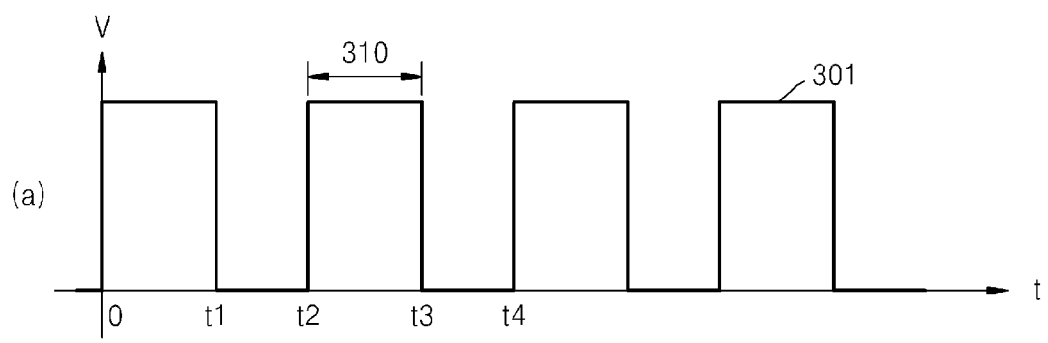
FIGS. 3A and 3B are graphs illustrating operation modes of the power supplier of FIG. 2.
Figure 3:
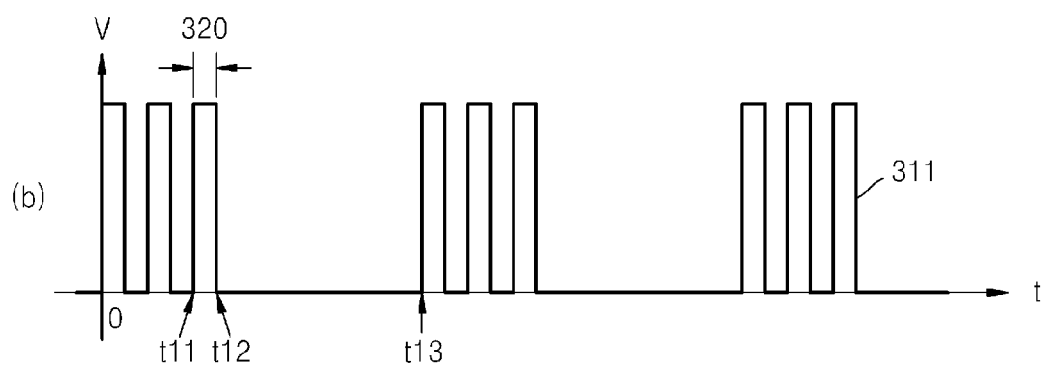
Figure 4:
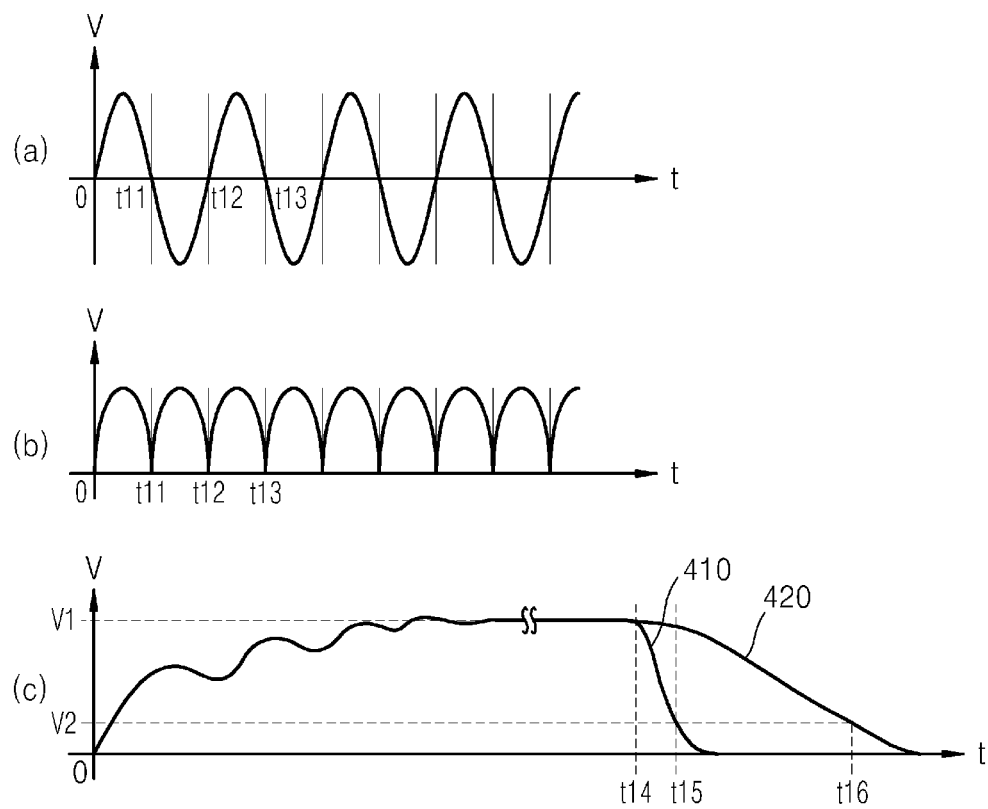
FIGS. 4A through 4C are graphs illustrating signals generated in the power supplier of FIG. 2.

Detailed operations of the discharger 230 and the switching transformer 240 are described below with reference to FIGS. 3 and 4.

Referring to FIG. 2 the output terminal N5 outputs an output voltage constituting a voltage transformed by the switching transformer 240. In detail, the output terminal N5 may be connected to a system load unit (not shown) consuming power in an electronic product, and supply power having a predetermined value to the system load unit.

Also, the output load unit 281 to adjust an output current amount or to compensate for cross output regulation may be additionally connected to the output terminal N5. For example, the output load unit 281 may include a dummy resistor, and in FIG. 2, the output load unit 281 includes a dummy resistor. The dummy resistor may be used for cross output regulation that may be generated at the output terminal N5.

FIGS. 3A and 3B are graphs illustrating operation modes of the power supplier 200 of FIG. 2.

The operation modes of the power supplier 200 may be largely classified into a general mode of continuously supplying predetermined power to the output terminal N5 (hereinafter, "general mode") and a skip mode of supplying the least power to the output terminal N5 (hereinafter, "skip mode").

FIG. 3A illustrates a switching driving signal 301 output by the first controller 229 in the general mode.

The general mode may be a load that is greater than or equal to a predetermined load where the dummy resistor of the output load unit 281 has a resistance that is less than or equal to a predetermined resistance. Referring to FIG. 3A, in the general mode, a logic high level of the switching driving signal 301 is set long and has a pulse waveform with a period that is greater than a predetermined period.

The switching transformer 240 performs the switching transformation operation from time intervals from 0 to t1 and from t2 to t3 when the switching driving signal 301 is output in a logic high level. Accordingly, predetermined power is transmitted from the first inductor 241 to the second inductor 242 during the time intervals from 0 to t1 and from t2 to t3.

FIG. 3B illustrates a switching driving signal 311 output by the first controller 229 in the skip mode.

The skip mode refers to a standby mode where power consumption of the system load unit connected to the output terminal N5 is less than a predetermined power consumption and is also referred to as a burst control mode. Also, in the skip mode, the dummy resistor may be a load that is less than a predetermined load having a resistance that is greater than a predetermined resistance.

In the skip mode, the switching driving signal 311 has a short logic high level and has a pulse waveform with a period that is less than a predetermined period.

A time interval from t11 to t12 when the switching driving signal 311 is output in the logic high level is less than a time interval (for example, the time interval from t2 to t3) when the switching driving signal 301 is output in the logic high level in the general mode. Also, in the skip mode, an interval when the switching driving signal 311 is output in the logic high level is larger than an interval when the switching driving signal 311 is output in a logic low level.

Accordingly, in the skip mode, an amount of power transmitted from the first inductor 241 to the second inductor 242 is less than the general mode, and thus, may satisfy low standby power required by a predetermined standard.

FIGS. 4A through 4C are graphs illustrating signals generated in the power supplier 200 of FIG. 2.

FIG. 4A illustrates an AC voltage supplied by the power supply 216, wherein an x-axis denotes time and a y-axis denotes voltage.

Referring to FIG. 4A, in the power supply 216 supplying an AC voltage, a positive sine wave voltage and a negative sine wave voltage are alternately output. In detail, a negative voltage is output in a time interval from t11 to t12, and a positive voltage is output in a time interval from t12 to t13.

FIG. 4B illustrates a voltage output from the first rectifier 215, wherein an x-axis denotes time and a y-axis denotes voltage.

In FIG. 2, when the first rectifier 215 includes a bridge rectifier (not illustrated), the first rectifier 215 may convert a negative power voltage to a positive power voltage. For example, a negative voltage of the power supply 216 may be converted to a positive voltage in an interval from t11 to t12.

FIG. 4C illustrates a voltage trapped at both terminals of the first capacitor 217, where an x-axis denotes time and a y-axis denotes voltage.

The first capacitor 217 performs a charging operation by using the rectified voltage illustrated in FIG. 4B. Accordingly, a voltage at the two terminals of the first capacitor 217 continuously increases and saturates at a predetermined point of time, and thus, has a DC voltage form. In FIG. 4C, a charge voltage of the first capacitor 217 is at the top. A point of time t14 is when the power supply 216 is turned off, and the first capacitor 217 starts to discharge at the point of time t14.

In FIG. 4C, a graph 410 denotes voltage at two terminals of the first capacitor 217 in the power supplier 200. A line 420 denotes voltage at two terminals of a capacitor of a general power supplier, for example, the capacitor 125 of the power supplier 100 of FIG. 1.

Referring to FIG. 2, when the power supply 216 is turned off, the power state detector 220 detects the off state of the power supply 216, and transmits the detection information (e.g., that the power supply 216 is in an off-state) to the first controller 229. The first controller 229 outputs a discharge control signal to the discharger 230 to turn on the first switching device SW1. Accordingly, the first switching device SW1 is turned on, and a current starts to flow through the first switching device SW1 disposed between the first and second nodes N1 and N2. The current flowing through the first switching device SW1 discharges the voltage charged in the first capacitor 217 at a time period less than a predetermined period of time.

Referring to the graph 410 of FIG. 4C, the power supplier 200 turns on the first switching device SW1 at the point of time t14 when the power supply 216 is turned off, thereby discharging the voltage charged in the first capacitor 217 at a time period than a predetermined time.

However, a time greater than or equal to a predetermined time is taken for the voltage charged in the first capacitor 125 to be discharged even if the power supply 110 is turned off in the power supplier 100 of FIG. 1.

In FIG. 4C, a voltage V2 that is greater than a predetermined voltage is set until there is no possibility for a user to receive an electric shock. Thus, when a voltage charged in a capacitor is equal to or above the voltage V2, the user may get an electric shock or get burned due to the electric shock by contacting the capacitor.

For example, if a time taken for the first capacitor 217 to be discharged to the voltage V2 is from t14 to t15 when the power supply 216 is turned off, a time taken for the capacitor 125 to be discharged to the voltage V2 may be from t14 to t16.

As described above, in FIG. 2, the voltage of the first capacitor 217 is discharged within a time period that is less than or equal to a predetermined period of time by using the discharger 230, and thus, a possibility of discharge to the user due to the voltage charged in the first capacitor 217 may decrease.

Figure 5:
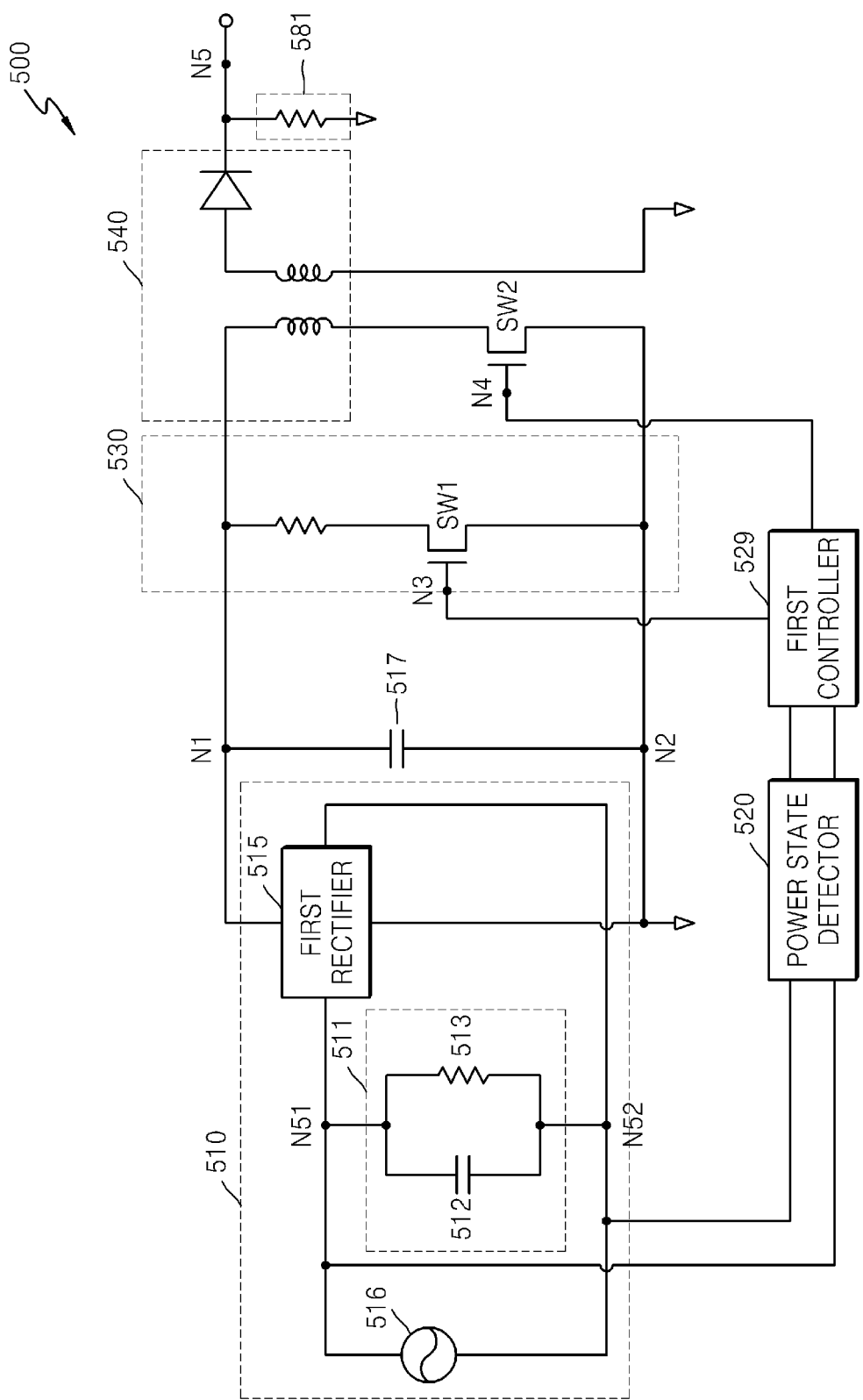
FIG. 5 is a detailed diagram illustrating the power supplier of FIG. 2 according to an embodiment of the present general inventive concept.

FIG. 5 is a detailed diagram illustrating the power supplier 200 of FIG. 2 according to an embodiment of the present general inventive concept.

Referring to FIG. 5, a power supplier 500 includes a power supply unit 510, a first capacitor 517, a power state detector 520, a first controller 529, a discharger 530, and a switching transformer 540. The power supplier 500 may include an output load unit 581.

The power supplier 500 of FIG. 5 corresponds to the power supplier 200 of FIG. 2. In detail, the power supply unit 510, the first capacitor 517, the power state detector 520, the first controller 529, the discharger 530, the switching transformer 540, and the output load unit 581 respectively correspond to the power supply unit 210, the first capacitor 217, the power state detector 220, the first controller 229, the discharger 230, the switching transformer 240, and the output load unit 281 of the power supplier 200 of FIG. 2, and thus, repeated descriptions thereof are omitted.

Compared to the power supplier 200 of FIG. 2, the power supplier 500 of FIG. 5 may further include an electro-magnetic interference (EMI) filter 511 in the power supply unit 510. The EMI filter 511 filters an EMI component generated in the power supply 216 and transmits at least one of a voltage and a current, from which an EMI component is removed, to a first rectifier 515.

The EMI filter 515 may include an EMI resistor 513 and an EMI capacitor 512 that is connected to the power supply 516 in parallel.

The EMI capacitor 512 is connected to the power supply 516 in parallel. In other words, the EMI capacitor 512 is connected between a $51^{st}$ node N51 and a $52^{nd}$ node N52 constituting two terminals of the power supply 516.

The EMI resistor 513 is connected to the EMI capacitor 512 in parallel.

For example, a capacitance of the EMI capacitor 512 and a resistance of the EMI resistor 513 may be designed according to a predetermined standard for limiting power consumption. In detail, when the capacitance of the EMI capacitor 512 is 1 uF, the EMI resistor 513 may be designed such that a discharge voltage of the EMI capacitor 512 is below or equal to Vcemi×Exp(−1). Here, Vcemi denotes a charge voltage of the EMI capacitor 512 and may be a voltage value of the power supply 516.

Figure 6:
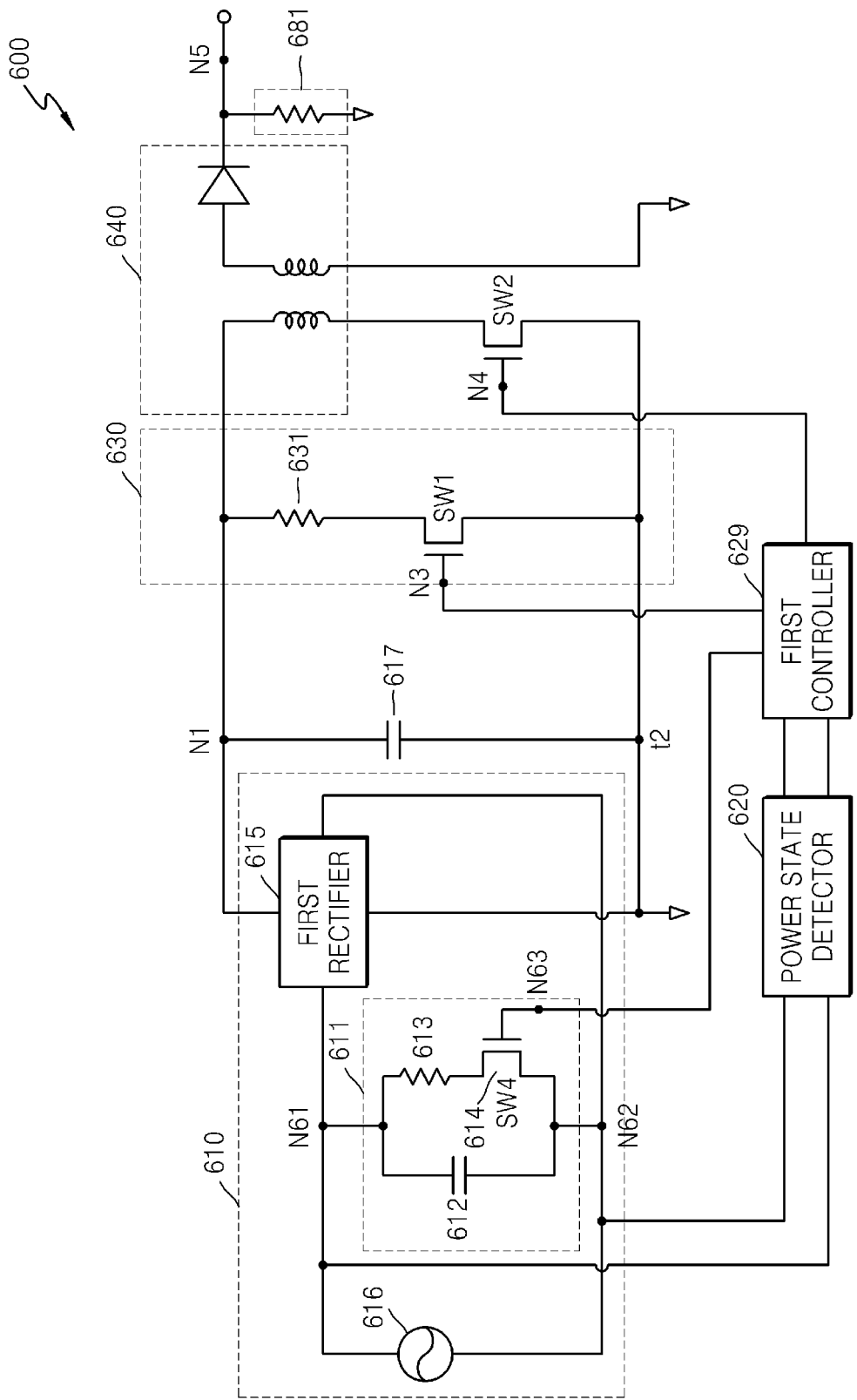
FIG. 6 is a detailed diagram illustrating the power supplier of FIG. 2 according to another embodiment of the present general inventive concept.

FIG. 6 is a detailed diagram illustrating the power supplier 200 of FIG. 2 according to another embodiment of the present general inventive concept.

Referring to FIG. 6, a power supplier 600 includes a power supply unit 610, a first capacitor 617, a power state detector 620, a first controller 629, a discharger 630, and a switching transformer 640. The power supplier 600 may further include an output load unit 681.

The power supplier 600 of FIG. 6 corresponds to the power supplier 200 of FIG. 2. In detail, the power supply unit 610, the first capacitor 617, the power state detector 620, the first controller 629, the discharger 630, the switching transformer 640, and the output load unit 681 respectively correspond to the power supply unit 210, the first capacitor 217, the power state detector 220, the first controller 229, the discharger 230, the switching transformer 240, and the output load unit 281 of FIG. 2, and thus, repeated descriptions thereof are not provided. The power supplier 600 may correspond to the power supplier 500 of FIG. 5. In detail, an EMI filter 611, an EMI capacitor 612, and an EMI resistor 613 respectively correspond to the EMI filter 511, the EMI capacitor 512, and the EMI resistor 513 of FIG. 5, and thus repeated descriptions thereof are not repeated.

Compared to the EMI filter 511 of FIG. 5, the EMI filter 611 of FIG. 6 may include an EMI switching device SW4.

One terminal and an other terminal of the EMI switching device SW4 are respectively connected to an other terminal of the EMI resistor 613 and an other terminal of the EMI capacitor 612. Also, the EMI switching device SW4 is turned on or off by the first controller 629. In FIG. 6, a MOS transistor 614 is used as the EMI switching device SW4.

When a power supply 616 is in an off-state according to information transmitted from the power state detector 620, the first controller 629 generates a second discharge control signal and transmits the second discharge control signal to the EMI switching device SW4. In detail, the second discharge control signal controls the EMI switching device SW4 to be turned on so that the EMI capacitor 612 is discharged.

When the power supply 616 is turned off, the power state detector 620 detects the off-state, and transmits information about the off-state to the first controller 629. Accordingly, the first controller 629 generates the second discharge control signal and transmits the second discharge control signal to the EMI switching device SW4. If the EMI switching device SW4 is an N-type MOS transistor, the second discharge control signal is output in a logic high level when the power supply 616 is turned off.

In the EMI filter 611, the EMI switching device SW4 receives the second discharge control signal in the logic high level through a $63^{rd}$ node N63 constituting a gate terminal and is turned on in response to the second discharge control signal. Accordingly, a current flows through the EMI switching device SW4. The current quickly discharges a voltage charged in the EMI capacitor 612 through the EMI switching device SW4.

In FIG. 5, the resistance of the EMI resistor 513 is set so as to reduce standby power. In this case, a discharge time of the EMI capacitor 512 may be increased, and thus, a user may be harmed, for example, and may get burned, due to discharge.

In FIG. 6, when the power supply 616 is turned on, the EMI switching device SW4 is turned off, and thus, the EMI resistor 613 operates as if it has a resistance that is greater than a predetermined resistance. Accordingly, a current flowing through the EMI resistor 613 is blocked, thereby reducing power consumption.

Also, when the power supply 616 is turned off, the EMI switching device 614 is turned on and a current flows through the EMI resistor 613. Thus, the voltage charged in the EMI capacitor 612 is discharged at a time period less than a predetermined period of time, thereby preventing a discharge to the user.

Figure 7:
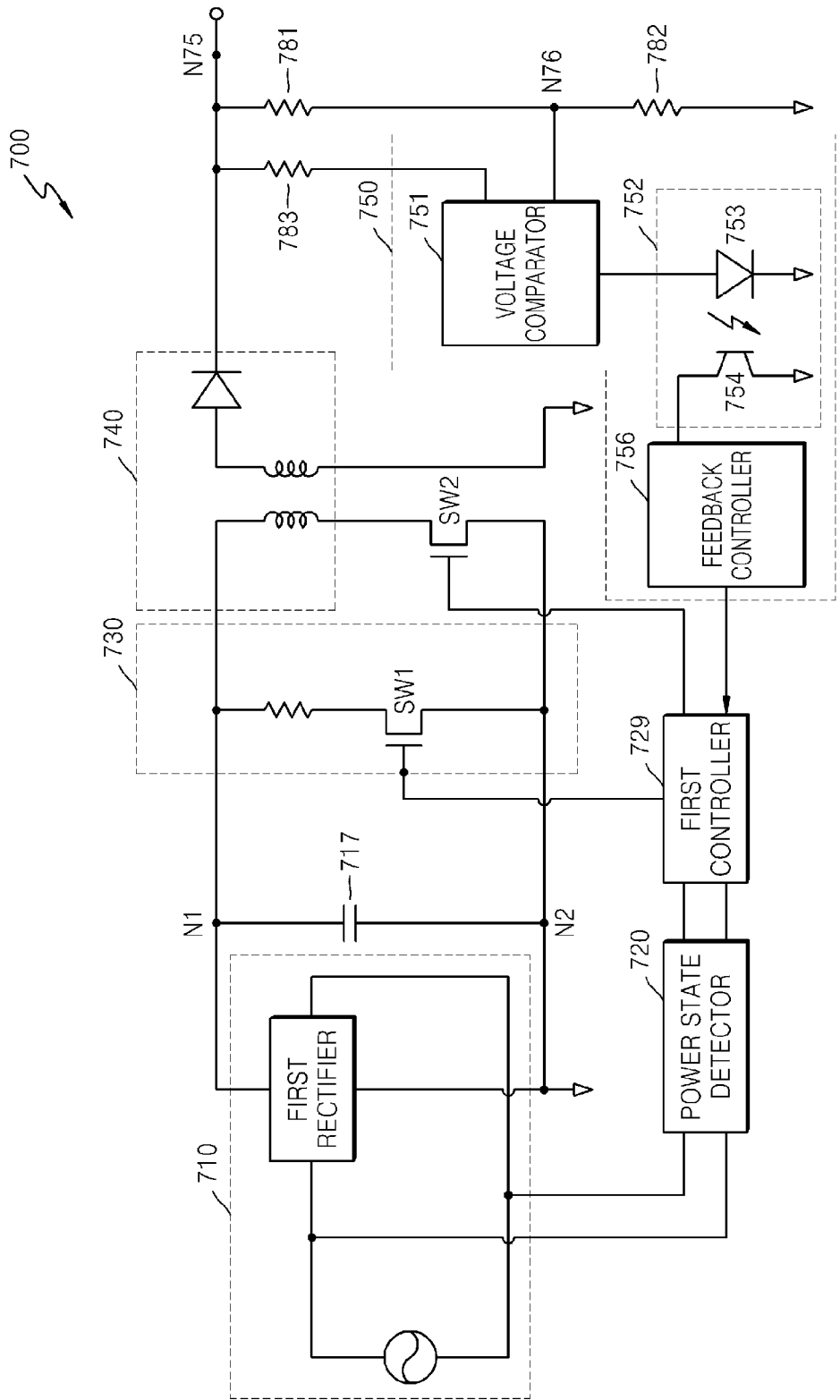
FIG. 7 is a detailed diagram illustrating the power supplier of FIG. 2 according to another embodiment of the present general inventive concept.

FIG. 7 is a detailed diagram illustrating the power supplier 200 of FIG. 2 according to another embodiment of the present general inventive concept.

Referring to FIG. 7, a power supplier 700 corresponds to the power supplier 200 of FIG. 2. In detail, a power supply unit 710, a first capacitor 717, a power state detector 720, a first controller 729, a discharger 730, and a switching transformer 740 respectively correspond to the power supply unit 210, the first capacitor 217, the power state detector 220, the first controller 229, the discharger 230, and the switching transformer 240 of FIG. 2, and thus repeated descriptions thereof are not provided. The power supply unit 710 may have the same structure as the power supply unit 610 of FIG. 6.

The power supplier 700 of FIG. 7 may include a feedback loop 750, compared to the power supplier 200 of FIG. 2.

The feedback loop 750 is connected to an output terminal N75, compares an output voltage output from the output terminal N75 and a target voltage to be output from the output terminal N75, and controls a switching driving signal to be adjusted according to the result of the comparison. In detail, the feedback loop 750 may include a voltage comparator 751, a photo coupler 752, and a feedback controller 756.

The feedback loop 750 may include a plurality of resistors 781 through 783 to form a path for the voltage comparator 751 to receive an output voltage trapped at the output terminal N75. The path to receive the output voltage may have a structure other than the one illustrated in FIG. 7.

The voltage comparator 751 is connected to the output terminal N75 and compares the output voltage and the target voltage. The comparison result is transmitted to the photo coupler 752. The voltage comparator 751 may transmit a difference between the output voltage and the target voltage as the comparison result. For example, the voltage comparator 751 may include a differential amplifier (not illustrated), and the differential amplifier may amplify and output the difference between the output voltage and the target voltage received through an input terminal.

The photo coupler 752 transmits the comparison result received from the voltage comparator 751 to the feedback controller 756. In detail, the photo coupler 752 separates a ground terminal by using photo coupling so that the voltage comparator 751 and the feedback controller 756 are not directly electrically connected to each other.

The feedback controller 756 controls a switching driving signal according to the comparison result received through the photo coupler 752. In detail, the feedback controller 756 may change a pulse width of the switching driving signal so that an output voltage identical to the target voltage is output according to the comparison result.

Figure 8:
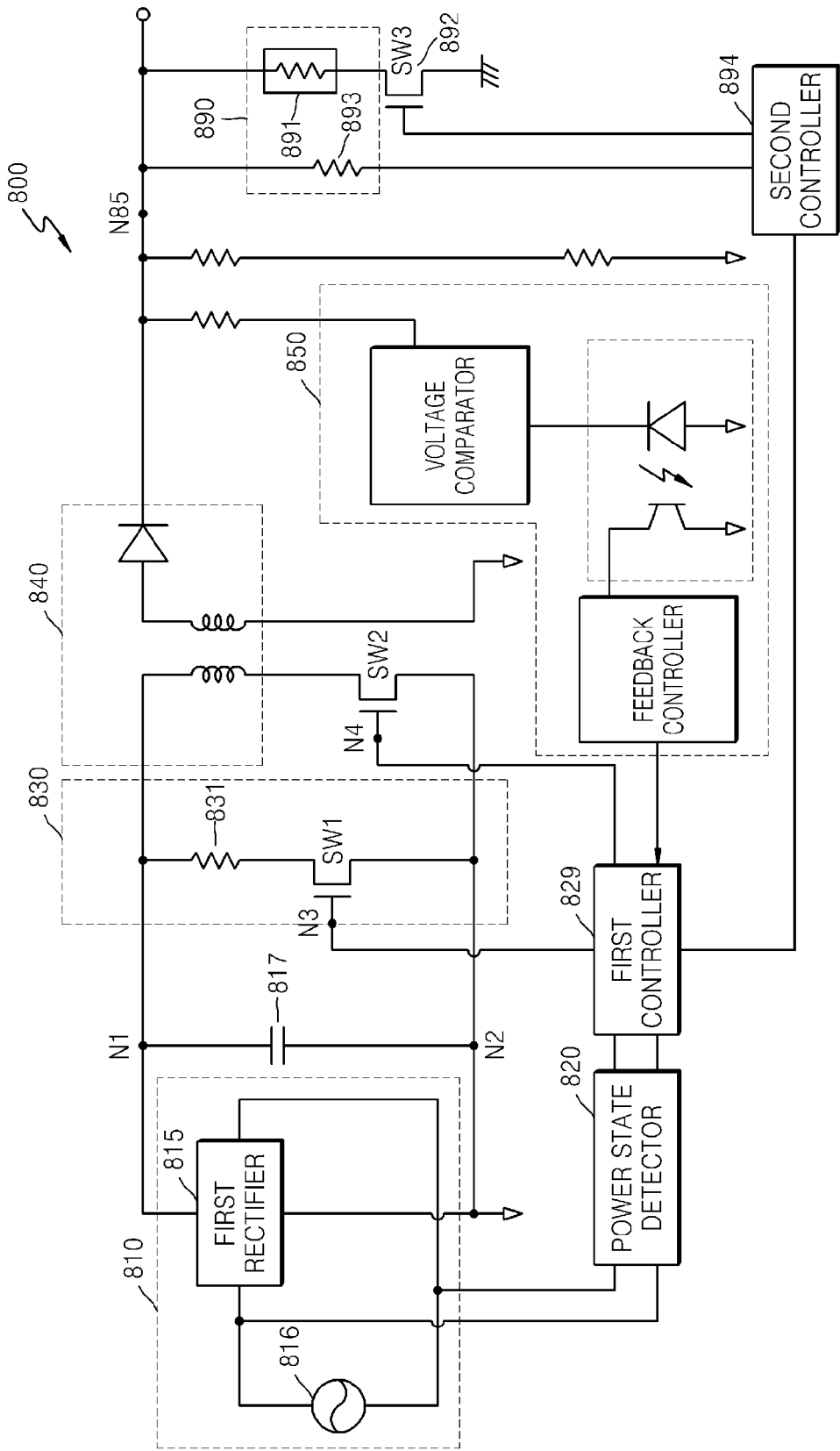
FIG. 8 is a detailed diagram illustrating the power supplier of FIG. 2 according to another embodiment of the present general inventive concept.

FIG. 8 is a detailed diagram illustrating the power supplier 200 of FIG. 2 according to another embodiment of the present general inventive concept.

Referring to FIG. 8, a power supplier 800 corresponds to the power supplier 200 described with reference to FIG. 2. In detail, a power supply unit 810, a first capacitor 817, a power state detector 820, a first controller 829, a discharger 830, and a switching transformer 840 respectively correspond to the power supply unit 210, the first capacitor 217, the power state detector 220, the first controller 229, the discharger 230, and the switching transformer 240 of FIG. 2, and thus repeated descriptions thereof are not provided. Also, the power supply unit 810 may have the same structure as the power supply unit 610 of FIG. 6, and the power supplier 800 may further include a feedback loop 850 corresponding to the feedback loop 750 of FIG. 7.

Compared to the power supplier 200 of FIG. 2, the power supplier 800 in FIG. 8 may further include a first output load 891, a third switching device SW3, and a second controller 894 so that a voltage trapped at an $85^{th}$ node N85 constituting an output terminal is quickly discharged. Also, the power supplier 800 may further include a second output load 893.

One terminal of the first output load 891 is connected to the $85^{th}$ node N85, and receives an output voltage. The first output load 891 corresponds to a load unit of a secondary side system 890 consuming the supplied output voltage.

The second output load 893 may be connected between the $85^{th}$ node N85 and the second controller 894 and may operate as a dummy resistor described above.

One terminal and an other terminal of the third switching device SW3 are connected to an other terminal of the first output load 891 and a ground, respectively. The third switching device SW3 is turned on or off according to control of the second controller 894. In detail, the third switching device SW3 is turned on or off according to a signal level of a third discharge control signal transmitted from the second controller 894. In FIG. 8, the third switching device SW3 includes an N-type MOS transistor 892.

The second controller 894 receives state information of a power supply 816 through the first controller 829. If the power supply 816 is an off-state, the second controller 894 controls the third switching device SW3 so that the first output load 891 is connected to the ground, or controls the power consumption of the first output load 891 to increase.

In detail, if the power supply 816 is in an off-state, the second controller 894 outputs the third discharge control signal in a logic high level. Accordingly, the third switching device SW3 is turned on or has increased power consumption, and a current flowing through the $85^{th}$ node N85 is discharged to the ground at a time period less than a predetermined period of time. When the current flowing through the $85^{th}$ node N85 is discharged to the ground, consumption of a voltage transmitted through the switching transformer 840 is accelerated. Thus, power transmitted through a first inductor including a first side is quickly transmitted to a second inductor including a second side. In other words, a voltage charged in the first capacitor 817 is discharged at a time period less than a predetermined period of time.

As described above, the power supplier 800 discharges the voltage charged in the first capacitor 817 at a time period less than a predetermined period of time according to the control of the second controller 894, thereby reducing a possibility of discharge to a user due to the first capacitor 817 when the power supply 816 is turned off.

Upon receiving the state information of the power supply 816 through the first controller 829, the second controller 894 may back up the secondary side system 890 receiving the output voltage when the power supply 816 is in an off-state. Here, after a predetermined time has passed after such a backup operation is performed, the first controller 829 controls the first switching device SW1 to be turned on by outputting a first discharge control signal.

When an operation error is generated in the power supplier 800 or the secondary side system 890, the first controller 829 or second controller 894 may block supplied power by turning off the power supply 816. When the power supply 816 is turned off, the power supplier 800 enters a standby mode so that power consumption is reduced to a predetermined value or lower. In order to reduce power consumption, a current amount flowing through the power supplier 800 is reduced. When the current amount is reduced, a period of time greater than a threshold time period passes for a voltage charged in the first capacitor 817 to be discharged.

The secondary side system 890 is rebooted only when the voltage charged in the first capacitor 817 is discharged to a predetermined value or lower. Thus, when the voltage charged in the first capacitor 817 is not discharged, the secondary side system 890 may not be rebooted even if the power supplier 800 is turned off. The second controller 894 may control backup and parking of the secondary side system 890 to minimize and/or prevent the secondary side system 890 from not being rebooted after the power supply 816 is blocked. In detail, when the power supply 816 is turned off, the second controller 894 may back up the output voltage received by secondary side system 890 or park the secondary side system 890 so as to increase operation reliability of the secondary side system 890.

Figure 9:
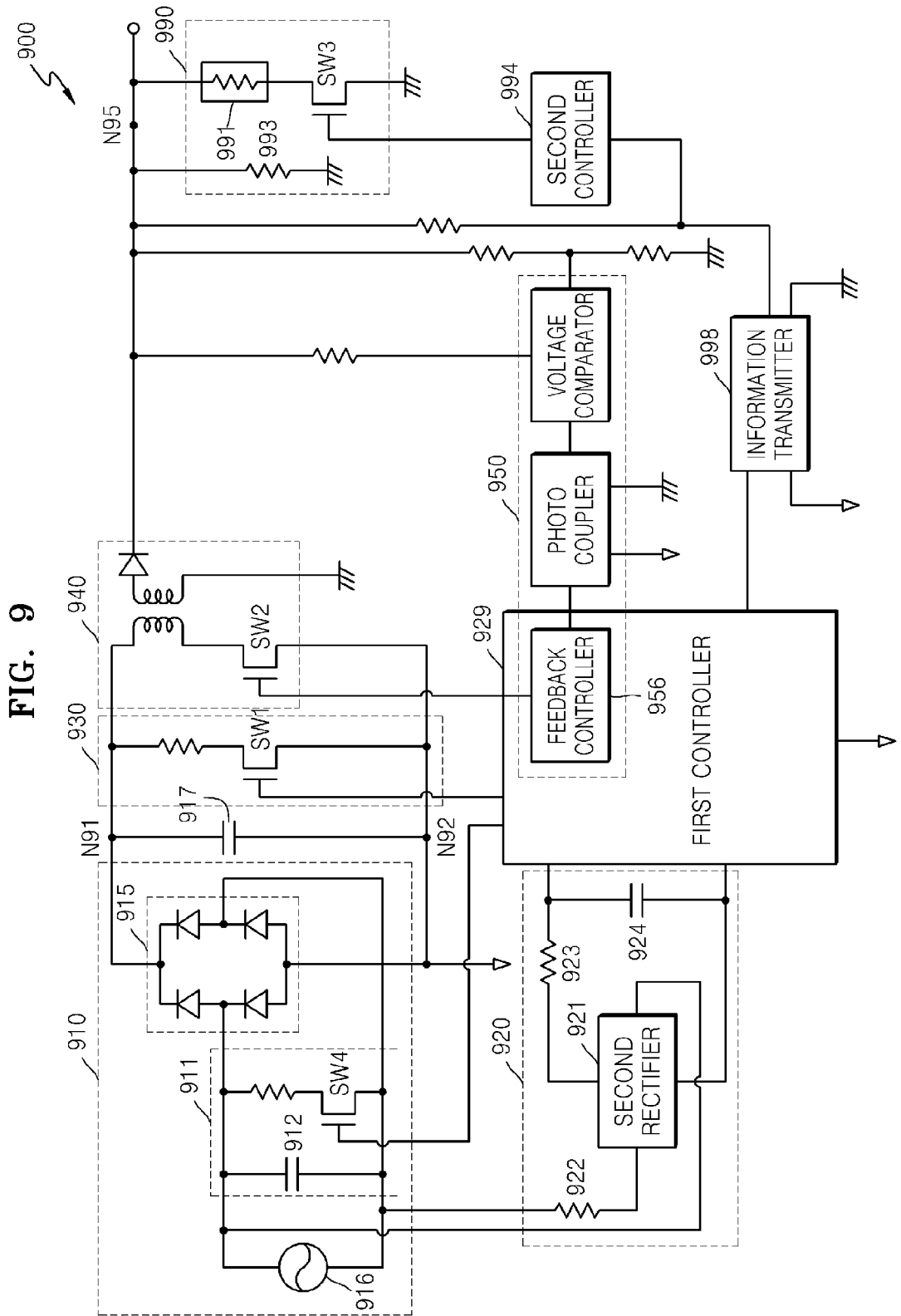
FIG. 9 is a diagram illustrating a power supplier according to another embodiment of the present general inventive concept.

FIG. 9 is a diagram illustrating a power supplier 900 according to another embodiment of the present general inventive concept.

Referring to FIG. 9, the power supplier 900 according to the current embodiment may correspond to the power supplier 200 of FIG. 2. In detail, a power supply unit 910, a first capacitor 917, a power state detector 920, a first controller 929, a discharger 930, and a switching transformer 940 respectively correspond to the power supply unit 210, the first capacitor 217, the power state detector 220, the first controller 229, the discharger 230, and the switching transformer 240 of FIG. 2, and thus repeated descriptions thereof are not provided.

The power supply unit 910 may have the same structure as the power supply unit 610 of FIG. 6, and the power supplier 900 may further include a feedback loop 950 corresponding to the feedback loop 750 of FIG. 7. In FIG. 9, a feedback controller 956 is included in the first controller 929. The power supplier 900 may further include a first output load 991, a second output load 993, a third switching device SW3, and a second controller 994 respectively corresponding to the first output load 891, the second output load 893, the third switching device SW3, and the second controller 894 of FIG. 8. An output load unit 990 may include the first output load 991, the second output load 993, and the third switching device SW3.

The power supplier 900 in FIG. 9 may correspond to the power supplier 600, 700, and 800 of FIGS. 6, 7, and 8 respectively. Accordingly, repeated descriptions of the power suppliers 600, 700, and 800 of FIGS. 6, 7, and 8 thereof are not provided.

The power supplier 900 may include the power supply unit 910, the first capacitor 917, the power state detector 920, the first controller 929, the discharger 930, the switching transformer 940, the output load unit 990, and the second controller 994. Also, the power supplier 900 may further include the feedback loop 950 and an information transmitter 998.

A first rectifier 915 corresponding to the first rectifier 215 of FIG. 2 may include a bridge diode rectifier. In the bridge diode rectifier, 4 diodes are connected as illustrated in FIG. 9 and output the same polarity voltage even if different polarity voltages are input. The bridge diode rectifier may increase voltage utility efficiency by performing full wave rectification.

In detail, the bridge diode rectifier receives the voltage illustrated in FIG. 4A from a power supply 916 and performs full wave rectification on the voltage to output the voltage illustrated in FIG. 4B.

The power state detector 920 may determine at least one of an on-state and an off-state of the power supply by using an RC time-constant value. In detail, the power state detector 920 includes a resistor 923 and a capacitor 924, which are connected to each other in series. The power state detector 920 may include a second rectifier 921.

The second rectifier 921 is connected to the power supply 916 in parallel. The second rectifier 921 rectifies an AC voltage supplied from the power supply 916 to output a DC component voltage. The second rectifier 921 may include a bridge diode rectifier, like the first rectifier 915.

One terminal of the resistor 923 is connected to the second rectifier 921, and the other terminal of the resistor 923 is connected to one terminal of the capacitor 924.

One terminal and the other terminal of the capacitor 924 are connected to the resistor 923 and the second rectifier 921, respectively.

The resistor 923 and the capacitor 924 form an RC circuit, and a voltage charged in the capacitor 924 is decreased when power, for example, a predetermined voltage, transmitted through the second rectifier 921 is blocked as the power supply 916 is turned off. When a time taken for the voltage charged in the capacitor 924 to drop about 63% is below or equal to a predetermined time, the power state detector 920 may determine that the power supply 916 is turned off.

The first controller 929 receives the charge voltage of the capacitor 924, constituting the voltage output from the power state detector 920, in real-time, and may determine that the power supply 916 is blocked if the voltage of the capacitor 924 is decreased to a predetermined value or lower within a predetermined time.

The power supplier 900 may further include the information transmitter 998 between the first controller 929 and the second controller 994.

The information transmitter 998 quickly transmits state information of the power supply 916 received from the first controller 929 to the second controller 994. In detail, the information transmitter 998 may include a photo coupler and transmit the state information of the power supply 916 to the second controller 994 while a pre-terminal of a first inductor at a primary side and a post-terminal of a second inductor at a secondary side are electrically separated from each other.

The first controller 929 generates a switching driving signal to control a switching transformation operation and transmits the switching driving signal to the switching transformer 940. When the state of the power supply 916 detected by the power state detector 920 is in the off-state, at least one of the voltage charged in the first capacitor 917, a voltage charged in an EMI capacitor, and a voltage, i.e., an output voltage, trapped at a $95^{th}$ node N95 is controlled to be discharged. In detail, at least one of a first switching device SW1, an EMI switching device SW4, and the third switching device SW3 may be controlled to be turned on. In detail, first and second discharge control signals of the first switching device SW1 and the EMI switching device SW4 may be directly generated by the first controller 929. The first controller 929 notifies the off-state of the power supply 916 to the second controller 994 so that the second controller 994 generates the third discharge control signal, thereby controlling the third switching device SW3 to be turned on.

Figure 10:
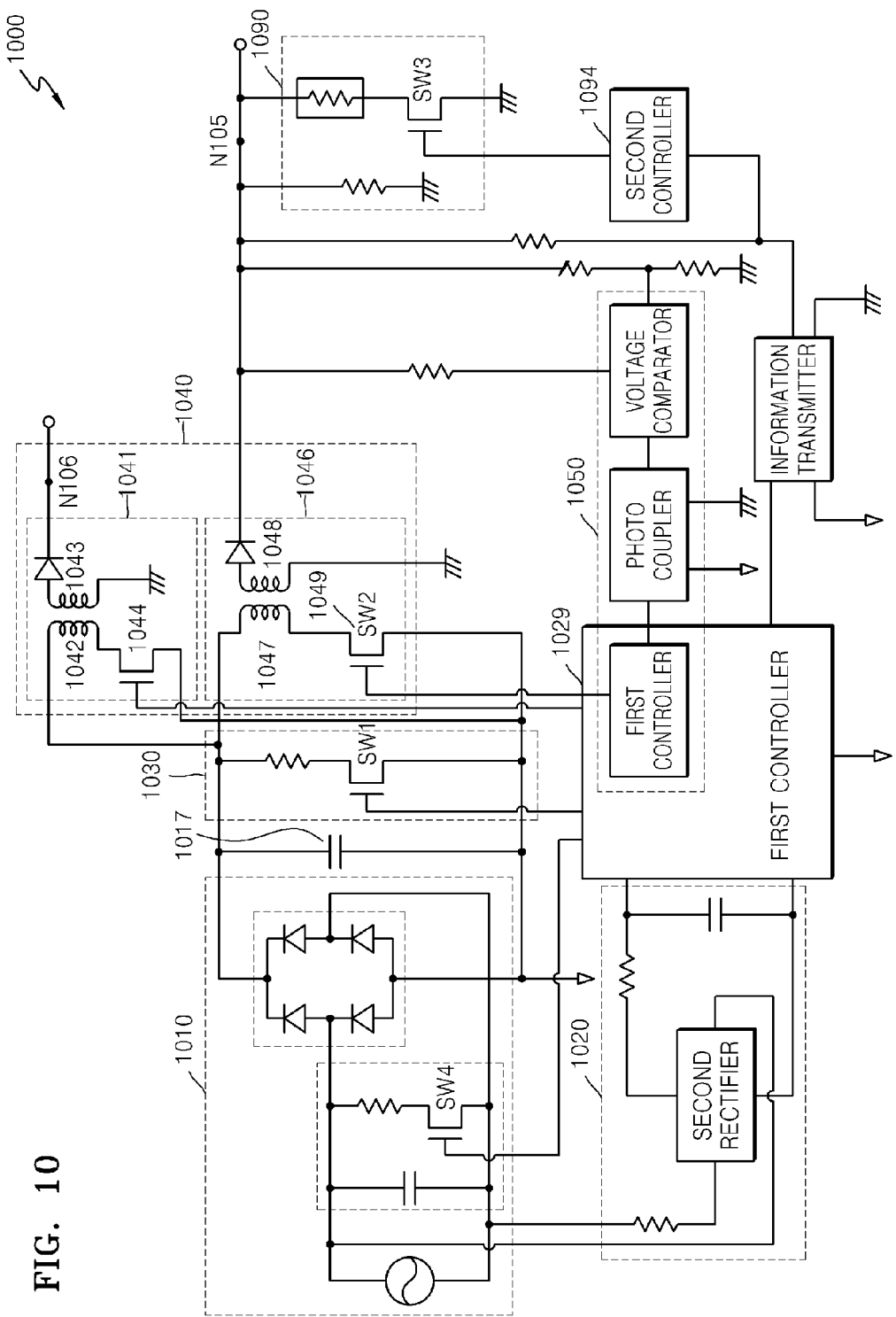
FIG. 10 is a diagram illustrating a power supplier according to another embodiment of the present general inventive concept.

FIG. 10 is a diagram illustrating a power supplier 1000 according to another embodiment of the present general inventive concept.

Referring to FIG. 10, elements of the power supplier 1000, not including a switching transformer 1040 and a first controller 1029, are identical to those of the power supplier 900 of FIG. 9, and thus repeated descriptions thereof are not provided. In detail, a power supply unit 1010, a first capacitor 1017, a power state detector 1020, the first controller 1029, a discharger 1030, a feedback loop 1050, an output load unit 1090, and a second controller 1094 respectively correspond to the power supply unit 910, the first capacitor 917, the power state detector 920, the first controller 929, the discharger 930, the feedback loop 950, the output load unit 990, and the second controller 994.

The first controller 1029 may generate at least two switching driving signals described above to control a switching transformation operation. The at least two switching driving signals may have different waveforms or the same waveforms. Hereinafter, the first controller 1029 generates first and second switching driving signals.

The switching transformer 1040 may include at least two switching transformers. In FIG. 2, the switching transformer 1040 includes first and second switching transformers 1041 and 1046.

The first and second switching transformers 1041 and 1046 each include an output terminal and supply a predetermined voltage to the output terminal. Each of the first and second switching transformers 1041 and 1046 may have the same structure as the switching transformer 240 of FIG. 2.

In detail, the first switching transformer 1041 receives the first switching driving signal from the first controller 1029 and turns a switching device 1044 on or off. When the switching device 1044 is turned on, a voltage trapped at a first inductor 1042 is transformed and transmitted to a second inductor 1043. A voltage trapped at the second inductor 1043 is supplied to a first output terminal N106.

The second switching transformer 1046 receives the second switching driving signal from the first controller 1029 and turns a switching device 1049 on or off. When the switching device 1049 is turned on, a voltage trapped at a first inductor 1047 is transformed and transmitted to a second inductor 1048. A voltage trapped at the second inductor 1048 is supplied to a second output terminal N105.

The power supplier 1000 according to the current embodiment may supply the same or different voltage to a plurality of output terminals by using power supplied from one power supply unit 1010.

Figure 11:
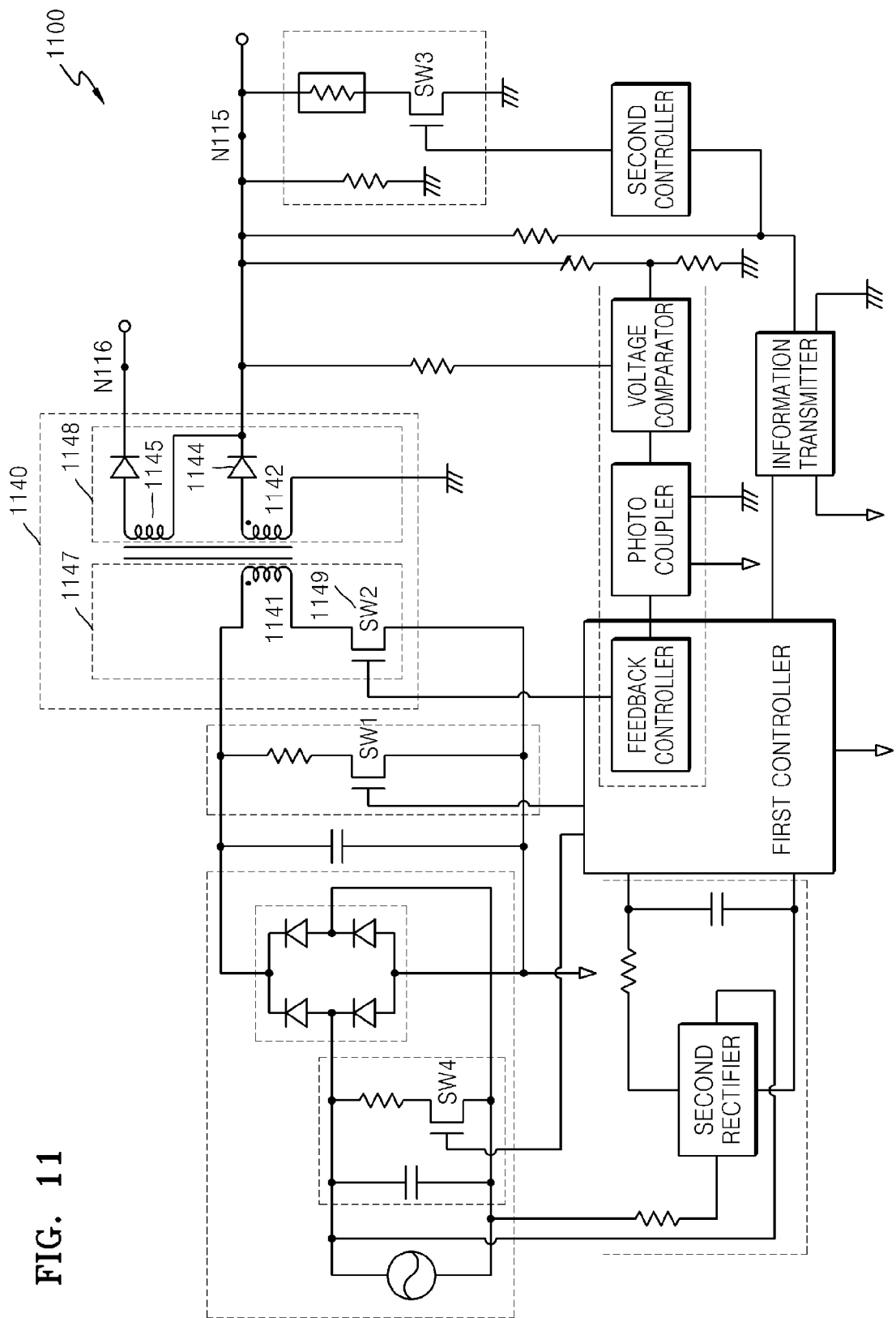
FIG. 11 is a diagram illustrating a power supplier according to another embodiment of the present general inventive concept.

FIG. 11 is a diagram illustrating a power supplier 1100 according to another embodiment of the present general inventive concept. Referring to FIG. 11, elements of the power supplier 1100, not including a switching transformer 1140, are identical to those of the power supplier 900 or 1000 of FIG. 9 or 10, and thus repeated descriptions thereof are not provided.

Referring to FIG. 11, the switching transformer 1140 may include a primary coil unit 1147 and a secondary coil unit 1148.

The primary coil unit 1147 includes a primary inductor 1141 and a second switching device 1149, and since the primary inductor 1141 and the second switching device 1149 are respectively identical to the first inductor 241 and the second switching device SW2 of FIG. 2, details thereof are not provided.

The secondary coil unit 1148 receives predetermined power from the primary coil unit 1147 and includes a plurality of second inductors 1145 and 1142 connected to each other in series. The plurality of second inductors 1145 and 1142 each output an output voltage to one terminal. In FIG. 11, two second inductors 1145 and 1142 are connected in series.

In detail, the second inductor 1145 supplies a voltage received from the primary inductor 1141 to an output terminal N116. Also, the second inductor 1142 supplies a voltage received from the primary inductor 1141 to an output terminal N115.

Figure 12:
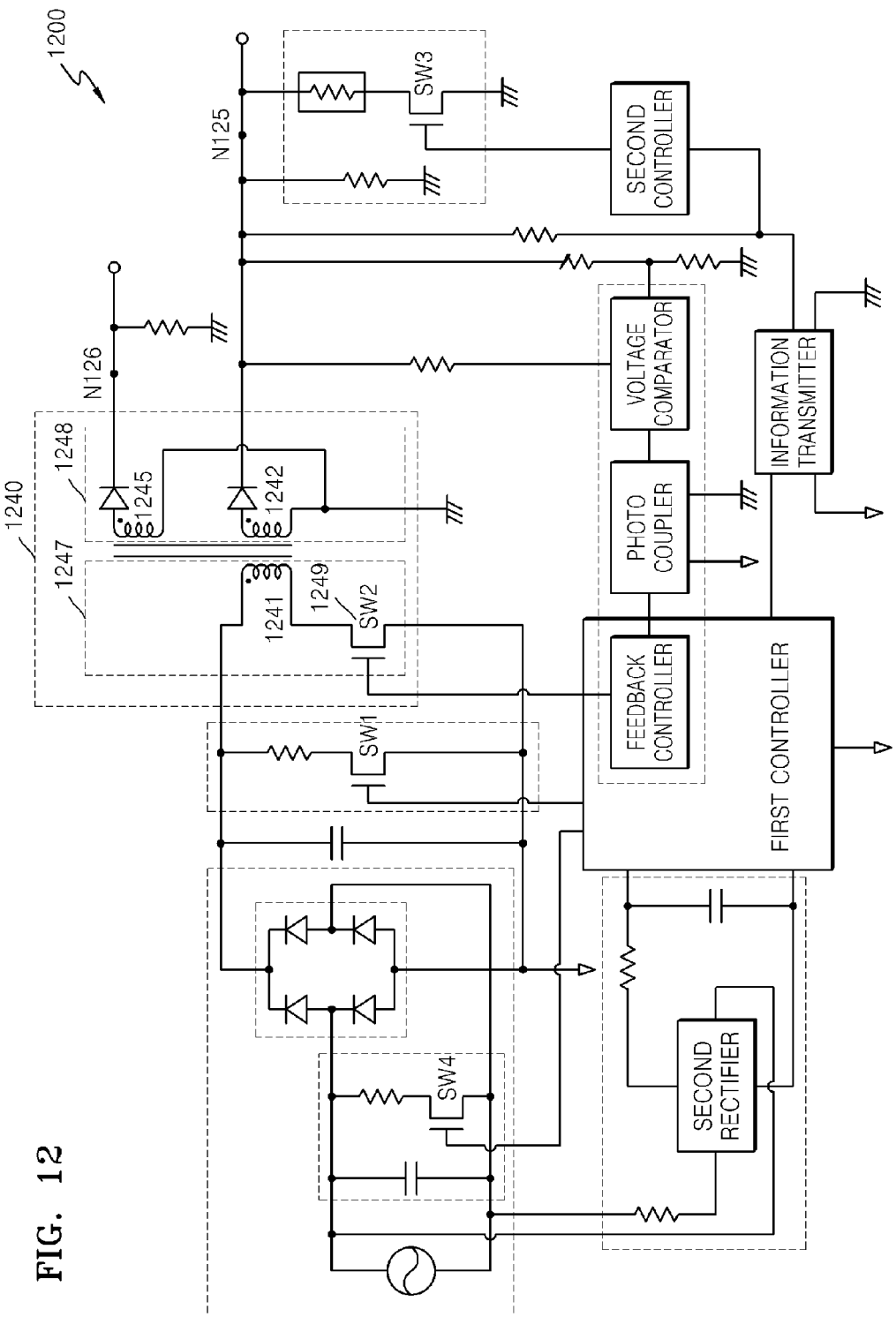
FIG. 12 is a diagram illustrating a power supplier according to another embodiment of the present general inventive concept.

FIG. 12 is a diagram illustrating a power supplier 1200 according to another embodiment of the present general inventive concept.

Referring to FIG. 12, elements of the power supplier 1200, excluding a switching transformer 1240, are identical to those of the power supplier 900, 1000, or 1100 of FIG. 9, 10, or 11, and thus repeated descriptions thereof are not provided.

The switching transformer 1240 includes a primary coil unit 1247 and a secondary coil unit 1248.

The primary coil unit 1247 includes a first inductor 1241 and a second switching device 1249. Since the primary coil unit 1247 is identical to the primary coil unit 1147 of FIG. 11, a detailed description thereof is not repeated.

The secondary coil unit 1248 receives predetermined power from the primary coil unit 1247 and includes a plurality of inductors, namely, second inductors 1245 and 1242, that are connected in parallel. Each of the second inductors 1245 and 1242 output an output voltage to one terminal. In FIG. 12, two second inductors 1245 and 1242 are connected in parallel.

In detail, one of the terminals of the second inductors 1245 and 1242 are connected to each other, and other output terminals N126 and N125 output a voltage.

The power suppliers 200 through 1200 according to the embodiments of the present general inventive concept may be included in any electronic device and supply power so that the electronic device performs a predetermined operation. In detail, examples of the electronic device include a television, a set-top box, an audio device, a video device, a computer, a mobile device, a washing machine, a refrigerator, a microwave oven, and a vacuum cleaner. In other words, the electronic device, such as a television, a set-top box, an audio device, a video device, a computer, a mobile device, a washing machine, a refrigerator, a microwave oven, or a vacuum cleaner, may include any one of the power suppliers 200 through 1200 of FIGS. 2 through 12.

Figure 13:
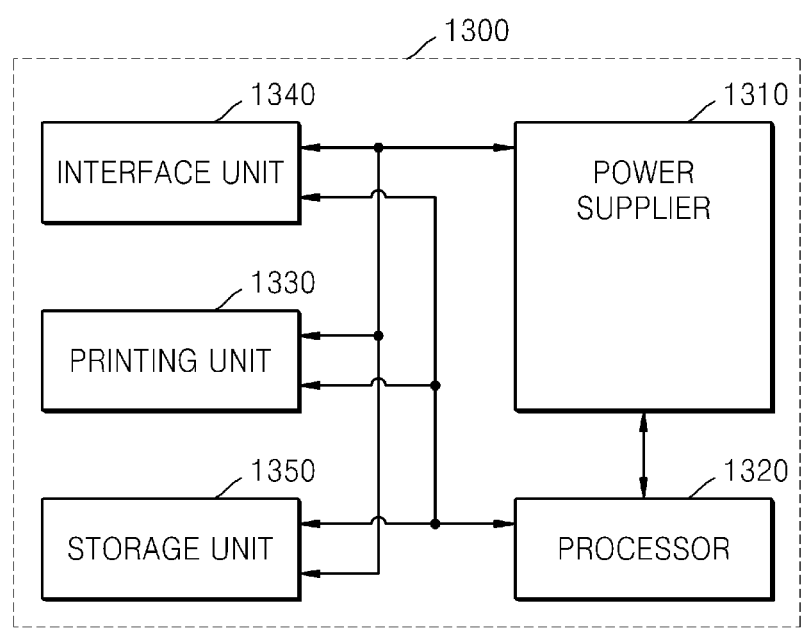
FIG. 13 is a block diagram illustrating an image forming apparatus according to an embodiment of the present general inventive concept.

FIG. 13 is a block diagram illustrating an image forming apparatus 1300 according to an embodiment of the present general inventive concept.

Referring to FIG. 13, the image forming apparatus 1300 includes a power supplier 1310, a processor 1320, and a printing unit 1330. Also, the image forming apparatus 1300 may further include an interface unit 1340 and a storage unit 1350.

The image forming apparatus 1300 is an apparatus to transfer and to print image data on a print paper constituting a print medium in a visible image form, according to a digital signal input from an external device, such as a printer, a scanner, or a multifunctional peripheral device. Here, the external device means a host device (not illustrated), and examples of the host device include a personal computer (PC) and a laptop. The host device is connectable to the image forming apparatus 1300 and is a device where a print driver is executed to perform a printing operation by the image forming apparatus 1300. The user may set various options to perform the printing operation by the image forming apparatus 1300, by using a printer driver executed by the host device.

The power supplier 1310 supplies predetermined power required to operate the image forming apparatus 1300. In detail, the power supplier 1310 supplies the predetermined power to at least one of the processor 1320, the printing unit 1330, the interface unit 1340, and the storage unit 1350 of the image forming apparatus 1300.

The power supplier 1310 may be any one of the power suppliers 200 through 1200 of FIGS. 2 through 12, and thus, repeated descriptions thereof are not provided.

The processor 1320 controls overall operations of the image forming apparatus 1300. In detail, the processor 1320 receives predetermined power from the power supplier 1310 and controls at least one of the printing unit 1330, the interface unit 1340, and the storage unit 1350 to perform a printing operation from a command or a request received from an external host device such as a laptop or desktop computer or the like.

The interface unit 1340 transmits and receives image data to and from the host device. The interface unit 1340 is connected to the host device wirelessly or with the use of wires. A print option may be selected on the host device, and the selected print option can be transmitted to the processor 1320 through the interface unit 1340. The processor 1320 may control the printing unit 1330 to perform the printing operation according to the received print option if the processor 1320 detects that the power supplier 1310 is on, or discontinue the printing operation if the processor 1320 determines that the power supplier 1310 is off.

Also, the interface unit 1340 may receive a predetermined command or data from the user by interfacing with the user.

The storage unit 1350 stores the image data received through the interface unit 1340.

The printing unit 1330 prints the image data stored in the storage unit 1350 according to control of the processor 1320.

Figure 14:
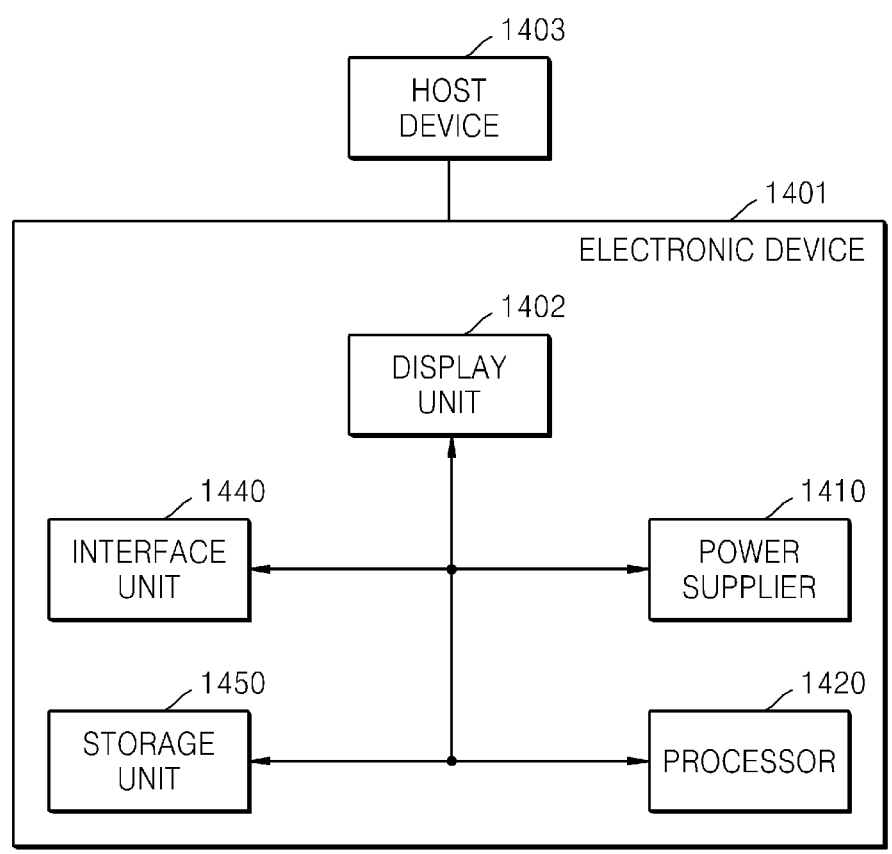
FIG. 14 is a block diagram illustrating an electronic apparatus according to an embodiment of the present general inventive concept.

FIG. 14 is a block diagram illustrating an electronic device 1401 according to an embodiment of the present general inventive concept. The electronic device 1401 can be a desktop computer, a tablet computer, a portable media player, a media server, a set top box, etc.

Referring to FIG. 14, the electronic device 1401 may include a display unit 1402, a power supplier 1410, a processor 1420, an interface unit 1440, and a storage unit 1450 that may respectively correspond to the power supplier 1310, processor 1320, interface unit 1340, and the storage unit 1350 of FIG. 13, so a repeated description is omitted thereof.

The power supplier 1410 may supply predetermined power required to operate the electronic device 1401. More particularly, the power supplier 1410 supplies the predetermined power to at least one of the processor 1420, the display unit 1401, the interface unit 1440, and the storage unit 1450.

The power supplier 1410 may be any one of the power suppliers 200 through 1200 in FIGS. 2-12, and power supplier 1310 in FIG. 13, and thus, repeated descriptions are not thereof provided.

The processor 1420 could include a controller, integrated circuit, programmable logic device, field programmable gate or the like to control the operations of the electronic device 1401. The processor 1420 can control the read and write operations to the storage unit 1450, and can control the display unit 1402 to display information processed in the electronic device 1401.

The interface unit 1440 may include a keyboard, a keypad, a touch screen, or a mouse. The interface unit 1440 may include a communication interface that may be connected wirelessly or with a wire to receive communication signals from another device. The interface unit 1440 may receive input or selections from a user to select one or more electronic device 1401 operations.

The storage unit 1450 may include a hard disk drive, a solid state memory, a flash memory, or a random access memory, etc. to store applications to be executed by the processor 1420 and store data and input received from the interface unit 1440.

An image data option can be selected from the host device 1403 (such as a laptop or desktop computer or the like), and the selected image data is transmitted to the processor 1420 through the interface unit 1440.

The display unit 1402 may display image data stored in the storage unit 1450 according to the control of the processor 1420 and display selections received from the interface unit 1440. The processor 1420 may control the display unit 1402 to display the image data chosen from the host device 1403.

The power supplier according to the one or more embodiments of the present general inventive concept is an apparatus to supply power through a switching mode operation and to quickly discharge a voltage charged in an internal capacitor when power is turned off. Accordingly, the power supplier and the image forming apparatus including the power supplier according to the embodiments of the present general inventive concept, can reduce a possibility of a user getting an electric shock from using the power supplier when the power supply is turned off, and increase safety.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A switch mode power supplier comprising:
a power supply to provide a direct current (DC) voltage by rectifying an alternating current (AC) voltage;
a first capacitor charged by a predetermined voltage corresponding to the rectified DC voltage;
a power state detector to detect an on-state or an off-state of the power supply for providing AC voltage;
a first controller to generate a first discharge control signal that has a signal level varying according to the state of the power supply and to control discharging of the predetermined voltage charged in the first capacitor when the AC voltage is in an off-state; and
a discharger connected to the first capacitor in parallel and to discharge the predetermined voltage charged in the first capacitor in response to the first discharge control signal.

2. The power supplier of claim 1, wherein the first switching device is connected in parallel to the first capacitor and is turned on or off in response to the first discharge control signal.

3. The power supplier of claim 2, wherein the first controller transmits the first discharge control signal to the discharger to turn on the first switching device, if the state of the power supply is in the off-state.

4. The power supplier of claim 2, wherein the discharger comprises:
a discharge resistor having one terminal connected to one terminal of the first capacitor; and
the first switching device having one terminal and an other terminal connected to an other terminal of the discharge resistor and an other terminal of the first capacitor, respectively, and that is turned on or off in response to the first discharge control signal.

5. The power supplier of claim 1, wherein the power state detector determines at least one of the on-state and the off-state of the power supply by using a resistance-capacitance time-constant value.

6. The power supplier of claim 1, wherein the power supply unit comprises:
the power supply to supply an alternating current (AC) voltage;
an electromagnetic interference (EMI) filter connected to the power supply in parallel to filter an EMI component generated in the AC voltage; and
a first rectifier to convert the AC voltage filtered through the EMI filter to a direct current (DC) voltage.

7. The power supplier of claim 6, wherein the EMI filter comprises:
an EMI capacitor connected to the power supply in parallel; and
an EMI resistor connected to the EMI capacitor in parallel.

8. The power supplier of claim 6, wherein the EMI filter comprises:
an EMI capacitor connected to the power supply in parallel;
an EMI resistor having one terminal connected to one terminal of the EMI capacitor; and
an EMI switching device having one terminal and an other terminal connected to an other terminal of the EMI resistor and an other terminal of the EMI capacitor, respectively, and that is turned on or off by the first controller.

9. The power supplier of claim 8, wherein the first controller outputs a second discharge control signal to the EMI filter to turn on the EMI switching device, if the power supply is in the off-state.

10. The power supplier of claim 1, wherein the first controller generates at least one switching driving signal, and the power supplier further comprises:
a switching transformer connected to the first capacitor in parallel to transform the predetermined voltage charged in the first capacitor according to a switching transformation operation performed in response to the switching driving signal; and an output terminal to output an output voltage corresponding to the transformed predetermined voltage by the switching transformer.

11. The power supplier of claim 10, further comprising:
a feedback loop connected to the output terminal to compare the output voltage actually output from the output terminal and a target voltage to be output from the output terminal, and to adjust the switching driving signal according to the comparison result.

12. The power supplier of claim 11, wherein the feedback loop comprises:
a voltage comparator connected to the output terminal and to compare the output voltage and the target voltage;
a photo coupler to generate a feedback signal corresponding to a difference value between the output voltage and the target voltage; and
a feedback controller to adjust the switching driving signal such that the output voltage is converged to the target voltage, in response to the feedback signal.

13. The power supplier of claim 11, further comprising:
a first output load having one terminal and an other terminal, the one terminal being connected to the output terminal;
a third switching device having one terminal and an other terminal connected to the other terminal of the first output load and a ground, respectively; and
a second controller to receive state information of the power supply through the first controller, and if the power supply is in the off-state, to control the third switching device such that the first output load is connected to the ground, or to control a power consumption of the first output load to increase.

14. The power supplier of claim 13, wherein the second controller receives the state information of the power supply through the first controller, and if the power supply is in the off-state, the second controller backs up a secondary side system receiving the output voltage.

15. The power supplier of claim 10, wherein the switching transformer comprises:
a primary coil unit, including:
a first inductor having one terminal connected to one terminal of the first capacitor, and
a second switching device having one terminal and an other terminal connected to an other terminal of the first inductor and an other terminal of the first capacitor, respectively, and that is turned on or off in response to the switching driving signal, and a secondary coil unit, including:
a second inductor to receive predetermined power from the primary coil unit.

16. The power supplier of claim 10, wherein the first controller generates at least two switching driving signals to control the switching transformation operation, and
the switching transformer performs the switching transformation operation in response to the at least two switching driving signals, and comprises at least two switching transformers connected to the first capacitor in parallel.

17. The power supplier of claim 10, wherein the switching transformer comprises:
a primary coil unit, including:
a first inductor having one terminal connected to one terminal of the first capacitor, and
a second switching device connected to an other terminal of the first inductor, and that is turned on or off in response to the switching driving signal; and a secondary coil unit, including:
a plurality of second inductors receiving predetermined power from the primary coil unit and connected in series, wherein each of the plurality of second inductors output the output voltage from one terminal.

18. The power supplier of claim 10, wherein the switching transformer comprises:
a primary coil unit, including:
a first inductor having one terminal connected to one terminal of the first capacitor, and
a second switching device connected to an other terminal of the first inductor and that is turned on or off in response to the switching driving signal; and a secondary coil unit, including:
a plurality of second inductors to receive predetermined power from the primary coil unit and connected in parallel, wherein each of the plurality of second inductors output the output voltage from one terminal.

19. An image forming apparatus comprising:
a processor to control image data to be printed;
a printing unit to print the image data according to control of the processor; and
a power supplier to supply predetermined power supply to each element including the processor and the printing unit, the power supplier including:
a power supply to provide a supplied power to the power supplier;
a first capacitor charged by a predetermined voltage corresponding to the supplied power supply;
a power state detector to detect an on-state or an off-state of the power supply;
a first controller to generate a first discharge control signal that has a signal level varying according to the state of the power supply and to control discharging of the predetermined voltage charged in the first capacitor; and
a discharger connected to the first capacitor in parallel to discharge the predetermined voltage charged in the first capacitor in response to the first discharge control signal.

20. The image forming apparatus of claim 19, further comprising:
an interface unit to receive the image data, predetermined data, or a command from a user; and
a storage unit to store the image data received from the interface unit.

21. An electronic device comprising:
a power supply to provide a direct current (DC) voltage by rectifying an alternating current (AC) voltage;
a first capacitor charged by a predetermined voltage corresponding to the rectified DC voltage;
a power state detector to detect an on-state or an off-state of the power supply for providing AC voltage;
a first controller to generate a first discharge control signal that has a signal level varying according to the state of the power supply and to control discharging of the predetermined voltage charged in the first capacitor when the AC voltage is in an off-state; and
a discharger connected to the first capacitor in parallel to discharge the predetermined voltage charged in the first capacitor in response to the first discharge control signal.

22. The electronic device of claim 21, wherein the discharger turns on the first switching device to discharge the predetermined voltage of the first capacitor when the power supply is in the off-state.

23. A switch mode power supplier comprising:
- a power supply to provide a direct current (DC) voltage by rectifying an alternating current (AC) voltage to a first capacitor;
- a power state detector to detect a state information of the power supply;
- a first controller to receive the state information and to generate a first discharge control signal according to the detected state information; and
- a discharger to receive the first discharge control signal from the first controller and to turn on a first switching device to discharge the supplied power to the first capacitor.

24. The power supplier of claim 23, wherein the discharger turns on the first switching device when the state information of the power supply indicates that the power supply is in an off-state.

25. The power supplier of claim 24, wherein the first controller generates a switching driving signal to control a switching transformation operation of a switching transformer so that the switching transformer can turn on a second switching device when the power supply is in the off-state to discharge the supplied power to the first capacitor.

26. The power supplier of claim 23, further comprising:
- an electromagnetic interference (EMI) filter to filter an EMI component generated in the power supply; and
- an EMI capacitor to receive the supplied power from the power supply.

27. The power supplier of claim 26, wherein the EMI filter comprises:
- an EMI switching device to receive a second discharge control signal from the first controller when the power state detector detects that the power supply is in an off-state to discharge the supplied power of the EMI capacitor.

28. A power supplier comprising:
- a power supply to provide a supplied power to a first capacitor;
- a power state detector to detect a state information of the power supply;
- a first controller to receive the state information and to generate a first discharge control signal according to the detected state information;
- a discharger to receive the first discharge control signal from the first controller and to turn on a first switching device to discharge the supplied power to the first capacitor; and
- a second controller to receive the state information of the power supply from the first controller and to generate a third discharge control signal to turn on a third switching device to discharge the supplied power to the first capacitor.

29. The power supplier of claim 28, further comprising:
- an information transmitter to transmit the state information of the power supply received from the first controller to the second controller.

30. The power supplier of claim 23, wherein the power supplier enters a standby mode to reduce a power consumption of the power supplier when the power supply is in the off-state.

31. The power supplier of claim 23, wherein the power state detector includes:
- an internal capacitor that forms a resistance-capacitance (RC) circuit with a resistor so that the power state detector can detect when the power supply is in the off-state by determining if a time taken for a voltage charged in the internal capacitor to drop a certain level is less than or equal to a predetermined time.

* * * * *